(12) United States Patent
Tachikawa et al.

(10) Patent No.: US 11,059,402 B2
(45) Date of Patent: Jul. 13, 2021

(54) CONVEYANCE SEAT

(71) Applicant: TS TECH CO., LTD., Saitama (JP)

(72) Inventors: Yoichi Tachikawa, Tochigi (JP);
Takatoshi Nakazawa, Tochigi (JP);
Naoto Nagasawa, Tochigi (JP); Wataru Honda, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 16/767,167

(22) PCT Filed: Nov. 28, 2018

(86) PCT No.: PCT/JP2018/043869
§ 371 (c)(1),
(2) Date: May 27, 2020

(87) PCT Pub. No.: WO2019/107451
PCT Pub. Date: Jun. 6, 2019

(65) Prior Publication Data
US 2020/0298738 A1    Sep. 24, 2020

(30) Foreign Application Priority Data

Nov. 30, 2017  (JP) .............................. JP2017-230133
Nov. 30, 2017  (JP) .............................. JP2017-230738
Nov. 30, 2017  (JP) .............................. JP2017-230739

(51) Int. Cl.
*B60N 2/16*    (2006.01)
*B60N 2/02*    (2006.01)
(Continued)

(52) U.S. Cl.
CPC ............. *B60N 2/68* (2013.01); *B60N 2/1615* (2013.01); *B60N 2/165* (2013.01); *B60N 2/22* (2013.01);
(Continued)

(58) Field of Classification Search
CPC ........ B60N 2/165; B60N 2/22; B60N 2/5825; B60N 2205/30; B60N 2/1615; B60N 2/68
See application file for complete search history.

(56) References Cited

U.S. PATENT DOCUMENTS 9,827,879 B2 * 11/2017 Fujita .................... B60N 2/0881
10,029,583 B2 * 7/2018 Hayashi ................... B60N 2/22
(Continued)

FOREIGN PATENT DOCUMENTS

CN    104512287 A    4/2015
JP    201-046140 A    3/2012
(Continued)

OTHER PUBLICATIONS

Internatianal Search Report dated Mar. 5, 2019 for the corresponding PCT Application No. PCT/JP2018/U43859, with Engiish machine translation.
(Continued)

*Primary Examiner* — Shin H Kim
(74) *Attorney, Agent, or Firm* — Michael Best & Friedrich LLP

(57) ABSTRACT

The number of components required to restrict the movement of an operating section, when a cushion frame is moved in the height direction, and a link member, which is for moving the cushion frame, is reduced. The seat is provided with: a drive link that is rotatably attached to the cushion frame and that moves the cushion frame in the height direction according to rotation thereof; a gear part that engages with the drive link and that rotates the drive link; a link-rotation restricting member for restricting the rotation range of the drive link; an operating section that accepts an operation for adjusting the height of the cushion frame; and a rotation application section for rotating the drive link via the gear part according to the operating section. The movement of the operating section is restricted (Continued)

as a result of the link-rotation restricting member abutting against the rotation application section.

7 Claims, 27 Drawing Sheets

(51) Int. Cl.
    *B60N 2/68*     (2006.01)
    *B60N 2/22*     (2006.01)
    *B60N 2/58*     (2006.01)

(52) U.S. Cl.
    CPC ........ *B60N 2/5825* (2013.01); *B60N 2205/30* (2013.01)

(56) References Cited

U.S. PATENT DOCUMENTS

| | | | |
|---|---|---|---|
| 10,369,907 B2* | 8/2019 | Baba | B60N 2/002 |
| 2001/0035673 A1* | 11/2001 | Lepaule | B60N 2/165 |
| | | | 297/338 |
| 2003/0047975 A1* | 3/2003 | Becker | B60N 2/1892 |
| | | | 297/313 |
| 2008/0224519 A1* | 9/2008 | Ventura | B60N 2/165 |
| | | | 297/313 |
| 2012/0279332 A1* | 11/2012 | Suzuki | B60N 2/165 |
| | | | 74/143 |
| 2013/0026806 A1* | 1/2013 | Yamada | B60N 2/167 |
| | | | 297/311 |
| 2015/0091338 A1 | 4/2015 | Hayashi | |
| 2016/0297337 A1 | 10/2016 | White et al. | |
| 2017/0240082 A1* | 8/2017 | Yokoyama | B60N 2/58 |
| 2017/0246966 A1* | 8/2017 | Hayashi | B60N 2/1615 |
| 2020/0282873 A1* | 9/2020 | Kajino | B60N 2/165 |
| 2020/0284330 A1* | 9/2020 | Kajino | F16H 31/002 |
| 2020/0298738 A1* | 9/2020 | Tachikawa | B60N 2/1615 |

FOREIGN PATENT DOCUMENTS

| | | |
|---|---|---|
| JP | 2012-192602 A | 10/2012 |
| JP | 2016022905 A | 2/2016 |
| JP | 2016-088411 A | 5/2016 |
| JP | 2016-166020 A | 9/2016 |
| KR | 10-2016-0087854 A | 7/2016 |
| WO | 2011/090098 A1 | 7/2011 |
| WO | 2012/029461 A1 | 3/2012 |
| WO | 2012/124346 A2 | 9/2012 |

OTHER PUBLICATIONS

Indian Examination Report dated Mar. 11, 2021 for the corresponding Indian Patent Application No. 202037027380.

* cited by examiner

CONVEYANCE SEAT

TECHNICAL FIELD

The present invention relates to a conveyance seat, and more particularly to a conveyance seat which allows a height of a seat cushion to be adjusted.

BACKGROUND ART

A conveyance seat provided with a height device which enables adjusting a height of a seat cushion has been known.

For example, as described in Patent Document 1, the height device is mounted between the seat cushion and a vehicle body floor, and includes a pair of front links provided on a seat front side and a rear link provided on a seat rear side. Further, the rear link serves as a drive link and enables adjusting a height of a seat main body.

Furthermore, in the invention described in Patent Document 1, an operation lever which operates the driving of the height device is mounted on an outer side of the drive link in a seat width direction, and a brake unit which regulates the driving of the height device is provided between the drive link and the operation lever.

Moreover, in the invention described in Patent Document 1, providing a restriction member configured to restrict a rotation range for each of the drive link and the operation lever imposes a limitation on a position adjustment range of the seat cushion and an operation range of the operation lever.

CITATION LIST

Patent Literature

Patent Document 1: Japanese Unexamined Patent Application Publication No. 2016-22905

SUMMARY OF INVENITON

Technical Problem

However, in the conventional technology, the mechanism which restricts the rotation ranges of the drive link and the operation lever is complicated, and the number of components is large.

In view of the above-described problem, it is an object of the present invention to provide a conveyance seat which enables reducing the number of components required to restrict the movement of an operating section, which is operated when a cushion frame is moved in a height direction, and a link member configured to move the cushion frame.

Solution to Problem

According to a conveyance seat of the present invention, the problem can be solved by a conveyance seat in which a height of a cushion frame is adjustable, including: a link member which is rotatably mounted on the cushion frame and moves the cushion frame in a height direction in correspondence with a rotation; a gear part which engages with the link member and rotates the link member; a link-rotation restricting member which restricts a rotation range of the link member; an operating section which accepts an operation to adjust the height of the cushion frame; and a rotation application section which rotates the link member via the gear part in correspondence with an operation of the operating section, in which the movement of the operating section is restricted when the link-rotation restricting member abuts on the rotation application section.

According to the conveyance seat, the movement of the operating section can be also restricted by the link-rotation restricting member which restricts the rotation range of the link member. Consequently, as compared with a case were a member which restricts the movement of the operating section is provided separately from the link-rotation restricting member, the number of components can be reduced.

That is, according to the conveyance seat, it is possible to reduce the number of components required to restrict the movements of the operating section, which is operated when the cushion frame is moved in the height direction, and the link member configured to move the cushion frame.

In the conveyance seat, preferably, the rotation application section includes a first protruding portion and a second protruding portion which protrude from an outer peripheral portion, the link-rotation restricting member is arranged between the first protruding portion and the second protruding portion, and the movement of the operating section is restricted when the first protruding portion and the second protruding portion abut on the link-rotation restricting member.

With this configuration, the rotation range of the rotation application section and the operation range of the operating section can be restricted with a simple configuration.

In the conveyance seat, preferably, each of the first protruding portion and the second protruding portion is a flange bent from the outer peripheral portion of the rotation application section toward the inside in a seat width direction.

With this configuration, the rigidity of the first protruding portion and the second protruding portion can be improved. Moreover, when the first protruding portion and the second protruding portion are configured to protrude on the inner side in the seat width direction, the first protruding portion and the second protruding portion can be arranged at positions where they do not interfere with the other members.

In the conveyance seat, preferably, the cushion frame includes side frames arranged on side portions, the link-rotation restricting member protrudes from each side frame toward the outer side in the seat width direction via a through hole provided in the side frame, and the operating section and the rotation application section are mounted on one of the right and left side frames which has the link-rotation restricting member mounted thereto.

When the link-rotation restricting member is mounted on the side to which loads from the operating section and the rotation application section are apt to be applied, the movement of the operating section can be more easily restricted by the link-rotation restricting member.

In the conveyance seat, preferably, the rotation application section includes a shock absorbing portion configured to absorb a shock when at least one of the first protruding portion and the second protruding portion abuts on the link-rotation restricting member.

With this configuration, it is possible to absorb a shock when at least one of the first protruding portion and the second protruding portion abuts on the link-rotation restricting member. Consequently, when an occupant operates the operating section, it is possible to alleviate a shock received upon reaching a limit of the operation range.

In the conveyance seat, preferably, the shock absorbing portion includes: a first notch portion which is formed in the first protruding portion on the side opposite to the side facing the second protruding portion; and a second notch portion which is formed in the second protruding portion on the side opposite to the side facing the first protruding portion.

With this configuration, a shock when the first protruding portion and the second protruding portion abut on the link-rotation restricting member can be absorbed with a simple configuration. Consequently, when the occupant operates the operating section, it is possible to further alleviate the shock received upon reaching the limit of the operation range.

In the conveyance seat, preferably, a cushion material arranged on the inner side of the cushion frame is provided, the cushion material vertically overlaps a part of the link-rotation restricting member inside the side frame in the seat width direction, and the cushion material does not vertically overlap a part of the link-rotation restricting member outside the side frame in the seat width direction.

With this configuration, since the cushion material can be arranged in a necessary portion, an increase in weight can be suppressed.

Advantageous Effects of Invention

According to the present invention, it is possible to reduce the number of components required to restrict the movements of the operating section, which is operated when the cushion frame is moved in the height direction, and the link member configured to move the cushion frame.

According to the present invention, the rotation range of the rotation application section and the operation range of the operating section can be restricted with a simple configuration.

According to the present invention, the rigidity of the first protruding portion and the second protruding portion can be improved.

According to the present invention, the movement of the operating section can be further easily restricted by the link-rotation restricting member.

According to the present invention, when an occupant operates the operating section, it is possible to alleviate a shock received upon reaching the limit of the operation range.

According to the present invention, a shock when the first protruding portion and the second protruding portion abut on the link-rotation restricting member can be absorbed with a simple configuration.

According to the present invention, an increase in weight can be suppressed.

DESCRIPTION OF EMBODIMENTS

Vehicle Seat According to First Embodiment

A vehicle seat S according to a first embodiment (which will be referred to as this embodiment hereinafter) of the present invention will now be described hereinafter with reference to FIG. 1 to FIG. 9.

In this embodiment, as the vehicle seat S, a vehicle seat mounted in a vehicle will be described as its example, but it may be a seat mounted in an aircraft or a ship which travels on a place other than the ground without being restricted to a vehicle seat mounted in a ground traveling vehicle with wheels such as an automobile or a railcar.

Further, the embodiment described below is just an example which facilitates the understanding of the present invention, and it does not restrict the present invention. That is, shapes, dimensions, arrangements, and others of members described below can be modified or improved without deviating from the purpose of the present invention, and it is needless to say that their equivalents are included in the present invention.

It is to be noted that "up-and-down", "front-to-back", and "right-and-left" directions in the following description coincide with "up-and-down", "front-to-back", and "right-and-left" directions when seen from an occupant of the vehicle seat S, respectively.

[Configuration of Vehicle Seat S]

Figure 1:
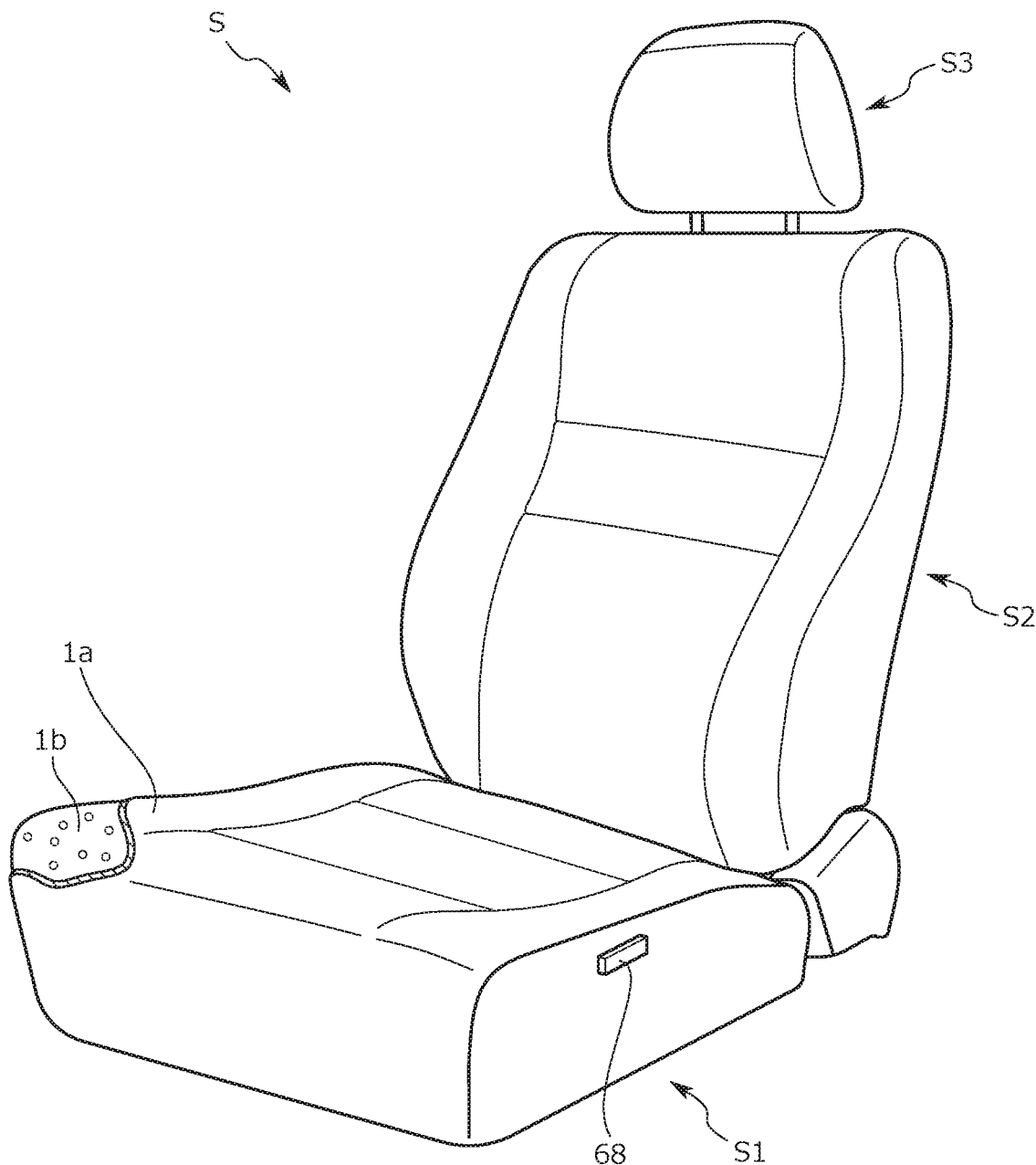
FIG. 1 is a perspective view of a seat according to a first embodiment.
Figure 1:
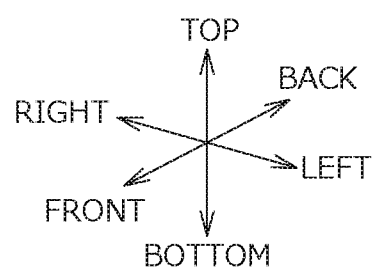

The vehicles seat S according to this embodiment has an appearance shown in FIG. 1. It is to be noted that, in FIG. 1, a part of the vehicle seat S (which is specifically a front end corner portion of a seat cushion S1) is shown as a configuration with a surface skin material 1a removed therefrom for the convenience of illustration.

The vehicle seat S has, as main constituent elements, the seat cushion S1 which becomes a sitting part supporting the buttocks of a seat occupant, a seatback S2 which becomes a backrest part supporting the back of the seat occupant, and a headrest S3 which is arranged above the seatback S2 and supports the head of the seat occupant.

Figure 2:
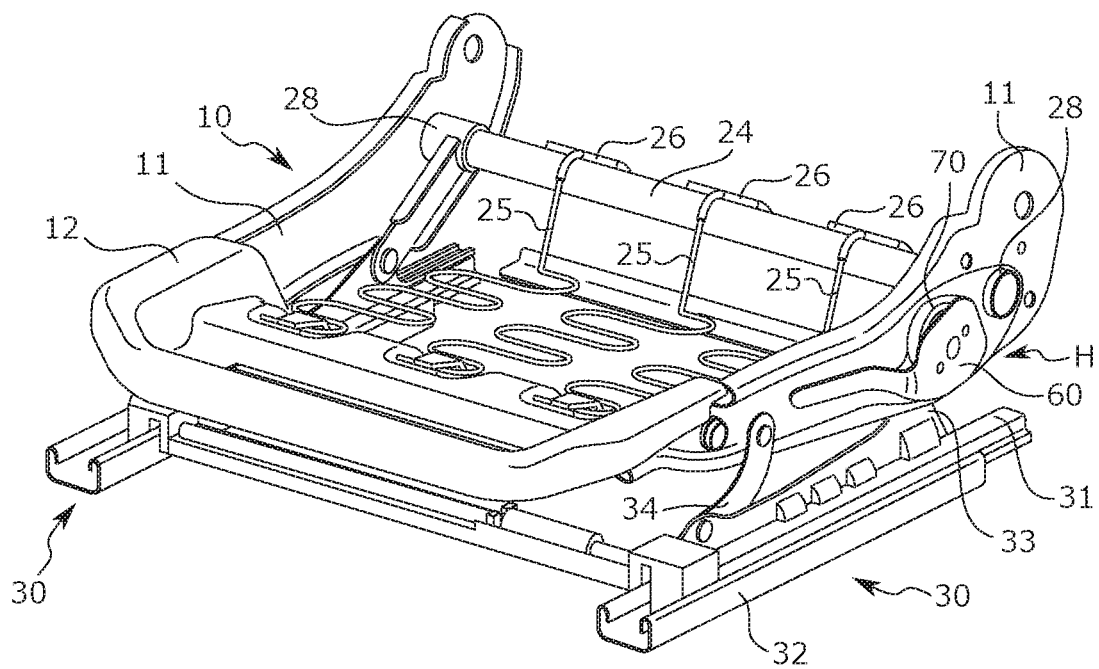
FIG. 2 is a perspective view of a cushion frame.
Figure 2:
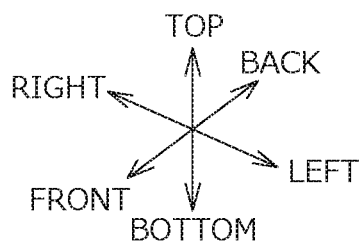

The seat cushion S1 is constituted by mounting a cushion material 1b on a cushion frame 10 which forms a framework shown in FIG. 2 and covering the cushion material 1b with a surface skin material 1a.

The seatback S2 is constituted by mounting a non-illustrated cushion material on a non-illustrated seatback frame and covering it with the surface skin material 1a.

The headrest S3 is constituted by arranging a non-illustrated cushion material on a non-illustrated core material and covering it with the surface skin material 1a.

It is to be noted that the surface skin material 1a provided on the vehicle seat S is made of, e.g., a material such as cloth or leather.

Furthermore, the cushion material 1b is an urethane base material molded by foam molding with the use of, e.g., an urethane foaming material.

[Configuration of Cushion Frame 10]

A description will now be given on the configuration of the cushion frame 10 with reference to FIG. 2.

As shown in FIG. 2, the cushion frame 10 has an outer shape which is a substantially rectangular frame shape when seen from above. Moreover, the cushion frame 10 has, as main constituent elements, a pair of side frames 11 constituting right and left end portions in a seat width direction respectively, a pan frame 12 constituting a front end portion of the cushion frame 10, and a coupling pipe 24 (a pipe frame) which couples the right and left side frames 11 at a rear end portion.

The right and left (pair of) side frames 11 are arranged to be separated from each other in the seat width direction so that a width of the cushion frame 10 can be defined, and also arranged to extend in a front-to-back direction. Additionally, the coupling pipe 24 is mounted on the rear side of the side frames 11, and the right and left side frames 11 are coupled on the rear side through the coupling pipe 24.

Specifically, cylindrical end portion sleeves 28 are formed on the rear end sides of the side frames 11, respectively. Further, the coupling pipe 24 can be inserted into the end portion sleeves 28, and welding the end portion sleeves 28 and the coupling pipe 24 in a state where the coupling pipe 24 has been inserted in the end portion sleeves 28 of the right and left side frames 11 causes joining the side frames 11 and the coupling pipe 24.

Further, the pan frame 12 is secured and bonded to the front sides of the right and left side frame 11, and the right and left side frames 11 are coupled with each other on the front side through the pan frame 12.

The pan frame 12 is mainly configured to support the femoral region of a seat occupant (an occupant), and it is a frame formed of a metal plate material whose upper surface is formed into a nearly flat and substantially rectangular shape.

Furthermore, pressure receiving members 25 are installed on the pan frame 12 and the coupling pipe 24. Although FIG. 2 shows an example where S springs are used as the pressure receiving members 25, the pressure receiving members 25 may be leaf springs.

In this embodiment, locking members 26 are mounted at rear end portions of the pressure receiving members 25, respectively. Moreover, front ends of the pressure receiving members 25 are locked by protrusions of the pan frame 12, and the locking members 26 provided at the rear ends of the pressure receiving members 25 are locked to the coupling pipe 24, whereby the pressure receiving members 25 are mounted in the cushion frame 10.

Further, a rear end portion of the cushion frame 10 is coupled with the non-illustrated seatback frame through a non-illustrated reclining mechanism. It is to be noted that a well-known configuration can be adopted as the seatback frame, and hence a detailed description thereof will be omitted.

Furthermore, the cushion frame 10 is coupled with slide rail mechanisms 30 installed on a vehicle body floor through height mechanisms H.

Each slide rail mechanism 30 has a lower rail 32 fixed on the vehicle body floor and an upper rail 31 which slides back and forth on the lower rail 32 as main constituent elements.

A fixing bracket 33 is disposed to each upper rail 31, and a front link 34 and a drive link 40 of the height mechanism H are disposed to the fixing bracket 33.

As described above, the cushion frame 10 is coupled with the slide rail mechanisms 30 through the fixing brackets 33, the front links 34, and the drive links 40.

Thus, when the upper rails 31 slide on the lower rails 32, the cushion frame 10 slides back and forth on the lower rails 32 by following the upper rails 31.

[Configuration of Height Mechanism H]

The configuration of each height mechanism H will now be described hereinafter with reference to FIG. 2 to FIG. 9. The height mechanism H is a mechanism configured to adjust a height of the cushion frame 10 to the slide rail mechanism 30.

In this embodiment, the height mechanism H has the front link 34, the drive link 40, a link-rotation restricting member 50, an operation member 60, and a gear part 70 as main constituent elements.

The operation member 60 is a member configured to accept a height adjusting operation using the height mechanism H from an occupant.

Figure 3:
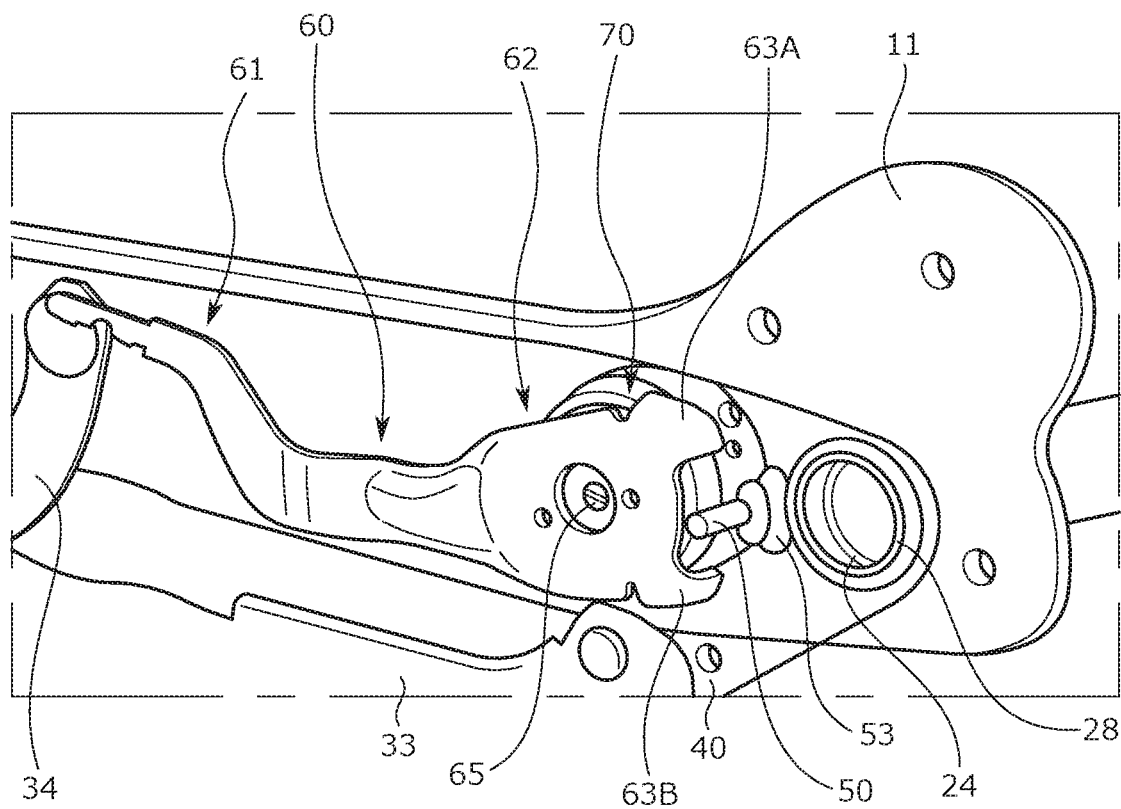
FIG. 3 is a rear perspective view of the vicinity of an operation member of a height mechanism H.
Figure 4:
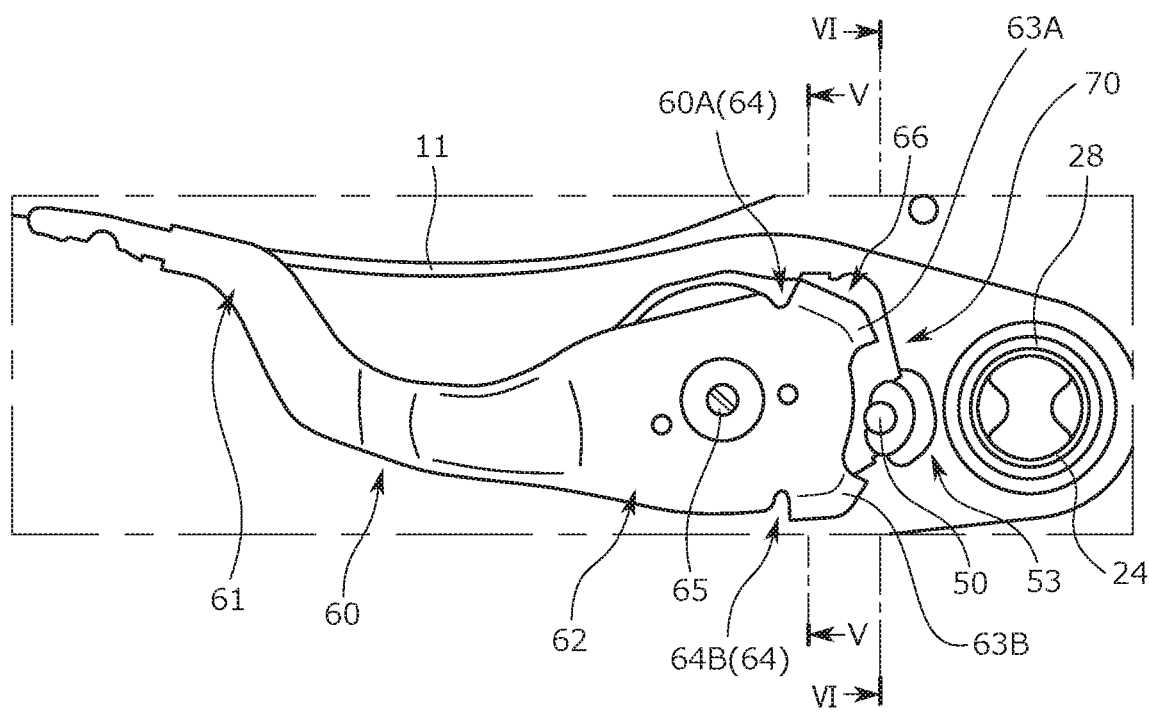
FIG. 4 is a side elevation of the vicinity of the operation member of the height mechanism H.
Figure 4:
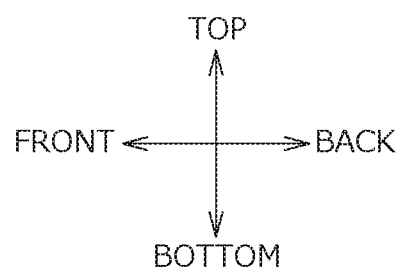
Figure 5:
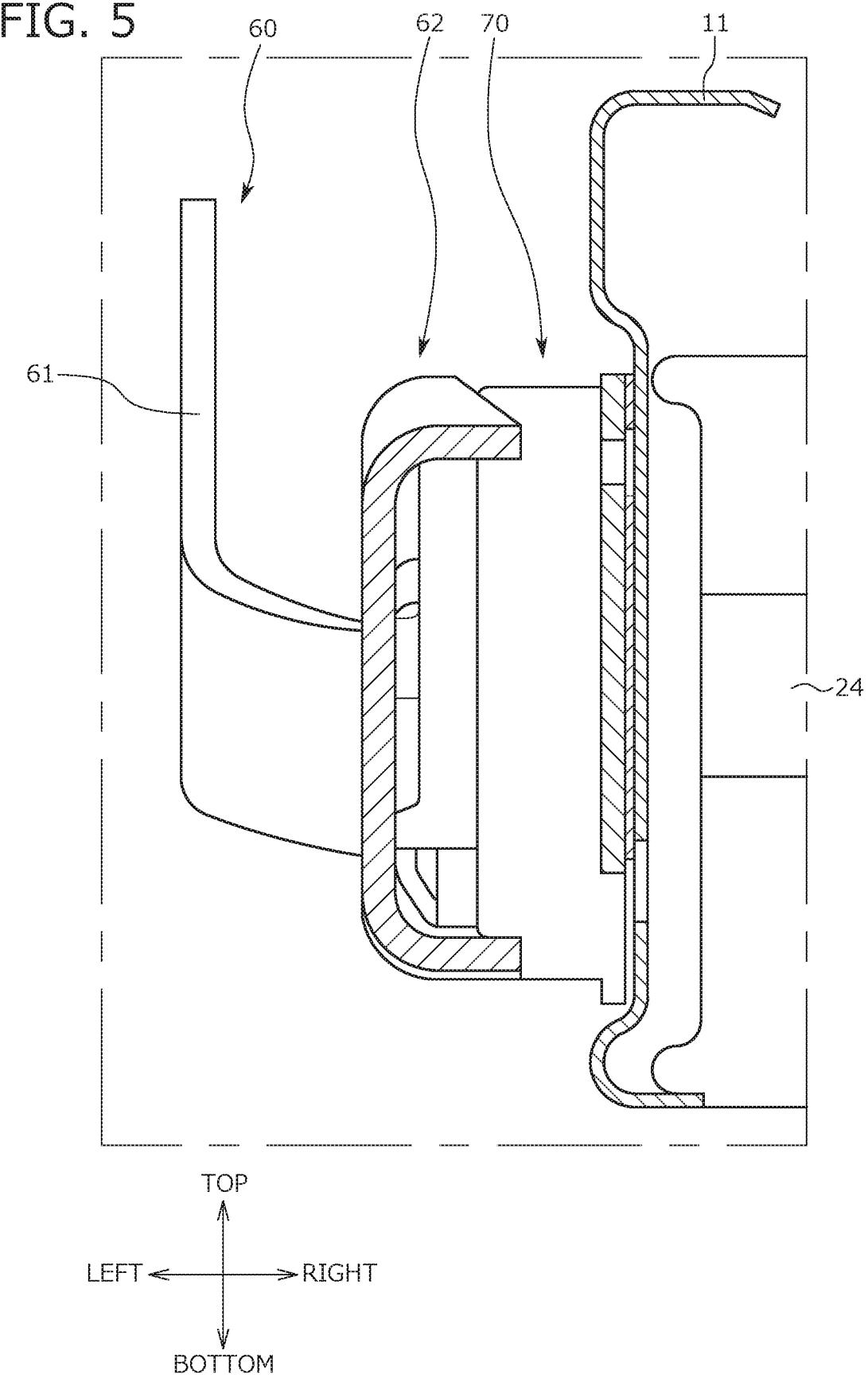
FIG. 5 is a V-V cross-sectional view of FIG. 4.

Specifically, as shown in FIG. 3 and FIG. 4, the operation member 60 includes an operating section 61 arranged on the front side and a rotation application section 62 arranged on the rear side.

The operating section 61 is a handle which accepts an operation for adjusting the height of the cushion frame 10. Specifically, a grip portion 68 which is gripped by an occupant is mounted to a front end of the operating section 61, and the operation for adjusting the height of the cushion frame 10 can be performed by moving up and down the operating section 61 in a state where the grip portion 68 is gripped.

Further, the rotation application section 62 is a member which transmits an operation of the operating section 61 to the gear part 70 and engages (meshes) with the gear part 70. Furthermore, the rotation application section 62 can rotate around a rotation shaft 65 of the gear part 70, and the rotation application section 62 rotates around the rotation shaft 65 in correspondence with an operation of the operating section 61. Consequently, a gear (which is specifically a pinion gear 71) constituting the gear part 70 can be rotated.

Figure 7:
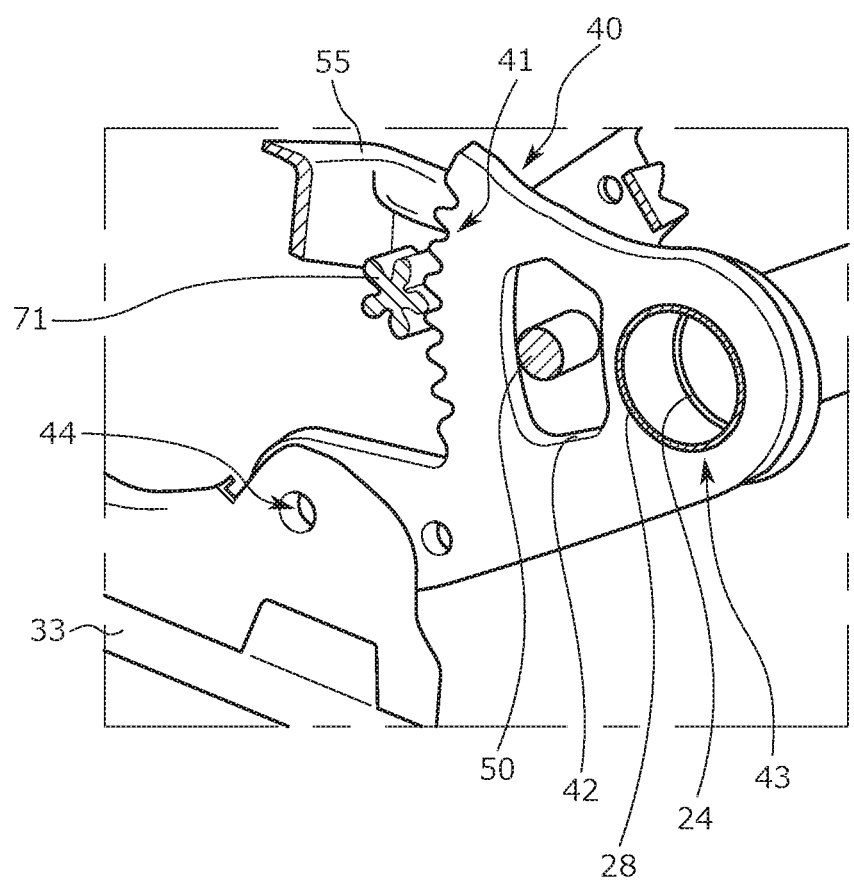
FIG. 7 is a VII-VII cross-sectional view of FIG. 6.
Figure 7:
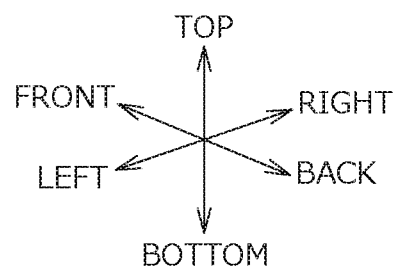

Here, as shown in FIG. 7, the gear part 70 has the pinion gear 71 which meshes with a sector gear 41 of the drive link 40. Moreover, when the pinion gear 71 rotates in correspondence with an operation of the operating section 61, a position of the sector gear 41 which meshes with the pinion gear 71 fluctuates.

It is to be noted that the gear part 70 functions as a brake unit which rotates the pinion gear 71 upon an input from the operation member 60 or restricts the rotation of the pinion gear 71 upon any other input.

Here, particulars of the configuration of the drive link 40 will now be described.

As shown in FIG. 7, the drive link 40 has the sector gear 41, an opening portion 42, a through hole 43, and a pivot shaft 44.

The drive link 40 is formed of a metal plate member and provided on the side frame 11 on the outer side (the left side in this example) in the seat width direction in the side frames 11 constituting the cushion frame 10.

The sector gear 41 is a gear tooth portion provided on an outer shape which is a substantially fan shape of the drive link 40. This sector gear 41 meshes with the pinion gear 71, and the drive link 40 rotates around the pivot shaft 44 as a rotation center in correspondence with the rotation of the pinion gear 71.

The opening portion 42 is a substantially rectangular opening formed in a substantially central portion of the drive link 40. Further, the link-rotation restricting member 50 extending in the seat width direction is inserted into the opening portion 42.

The through hole 43 is a hole formed on a rear end side of the drive link 40, the end portion sleeve 28 of the side frame 11 is inserted into the through hole 43, and the coupling pipe 24 is welded to the inside of the end portion sleeve 28.

Consequently, the coupling pipe 24 held by each end portion sleeve 28 can likewise rotate with the drive link 40 in correspondence with the rotation of the drive link 40.

Furthermore, the pivot shaft 44 is provided at the front end of the drive link 40 and mounted so that it can rotate to the fixing bracket 33. Specifically, the drive link 40 and the fixing bracket 33 can rotate on the pivot shaft 44 with the use of a shaft member such as a pin. Specifically, the drive link 40 can rotate in correspondence with the turning of the pinion gear 71 and a change in position of the sector gear 41 which meshes with the pinion gear 71.

Moreover, the pivot shaft 44 is fixed to the fixing bracket 33, and the pivot shaft 44 can swing together with the fixing bracket 33 in accordance with the upper rail 31.

Giving a description on an operation of the thus configured height mechanism H, when an occupant who is a seat occupant performs a height adjustment operation to the operation member 60, the pinion gear 71 rotates through the operating section 60. When the pinion gear 71 rotates, a meshing position of the pinion gear 71 and the sector gear 41 changes. Accordingly, the drive link 40 rotates around the pivot shaft 44, and the drive link 40 and the front link 34 thereby swing while rotating.

As described above, when the drive link 40 and the front link 34 rotate, the cushion frame 10 moves up and down, and the heights of the cushion frame 10 and the vehicle seat S are adjusted.

[Mechanism for Restricting Rotation Range of Drive Link 40]

A description will be given on a mechanism which restricts a rotation range of the drive link 40 with reference to FIG. 8.

Figure 8:
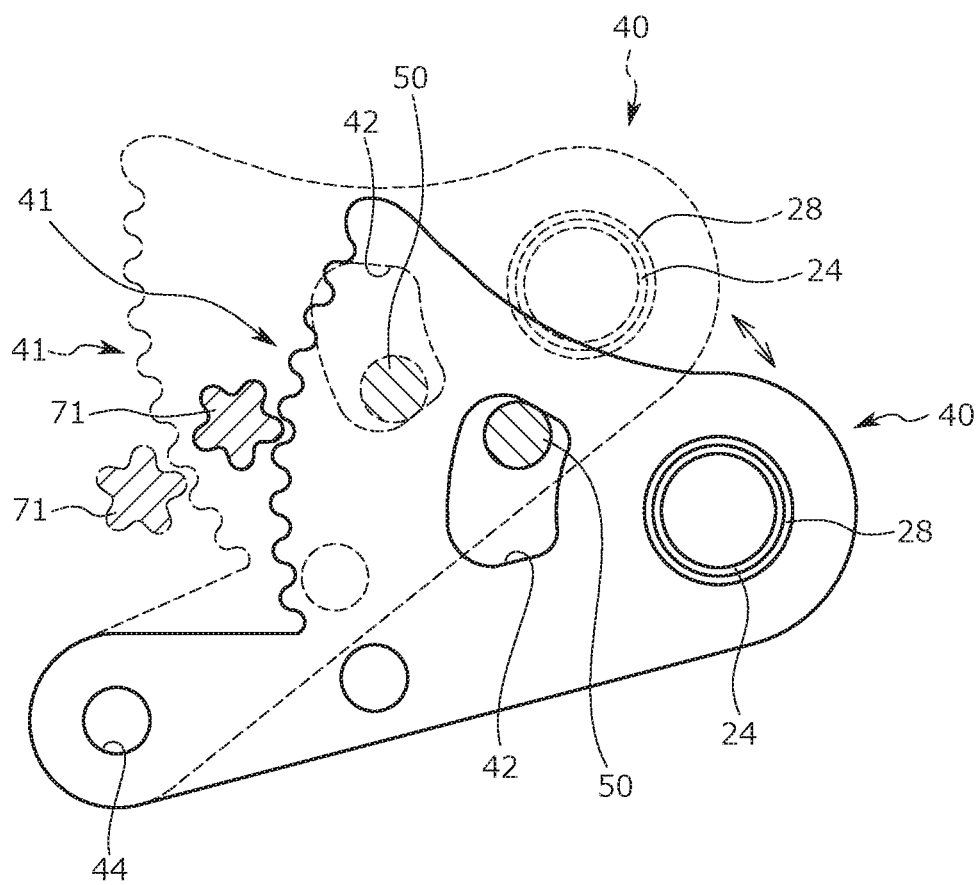
FIG. 8 is a view illustrating a rotation range of a drive link.
Figure 8:
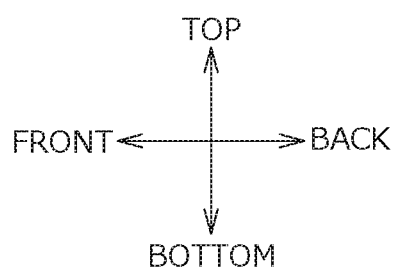

As shown in FIG. 8, when the pinion gear 71 turns, the drive link 40 rotates around the pivot axis 44.

For example, in a case where the pinion gear 71 rotates the drive link 40 downward (counterclockwise) around the pivot shaft 44, when the upper end of the opening portion 42 abuts on the link-rotation restricting member 50, the downward rotation of the drive link 40 is restricted.

Likewise, in a case where the pinion gear 71 rotates the drive link 40 upward (clockwise) around the pivot shaft 44, when the lower end of the opening portion 42 abuts on the link-rotation restricting member 50, the upward rotation of the drive link 40 is restricted.

As described above, since the link-rotation restricting member 50 has been inserted into the opening portion 42, the rotation range of the drive link 40 is restricted.

[Mechanism for Restricting Operation Range of Operating Section 61]

A mechanism which restricts an operation range of the operating section 61 will now be described. Specifically, in this embodiment, restricting a rotation range of the rotation application section 62 integrated with the operating section 61 enables the restriction of the operation range of the operating section 61.

As shown in FIG. 3, on a rear end side of the rotation application section 62, a first protruding portion 63A and a second protruding portion 63B as flanges bent from an outer peripheral portion 66 toward the inner side in the seat width direction are provided.

The first protruding portion 63A and the second protruding portion 63B are separated from each other in the up-and-down direction, and the columnar link-rotation restricting member 50 fixed to the cushion frame 10 is arranged between the first protruding portion 63A and the second protruding portion 63B.

Figure 6:
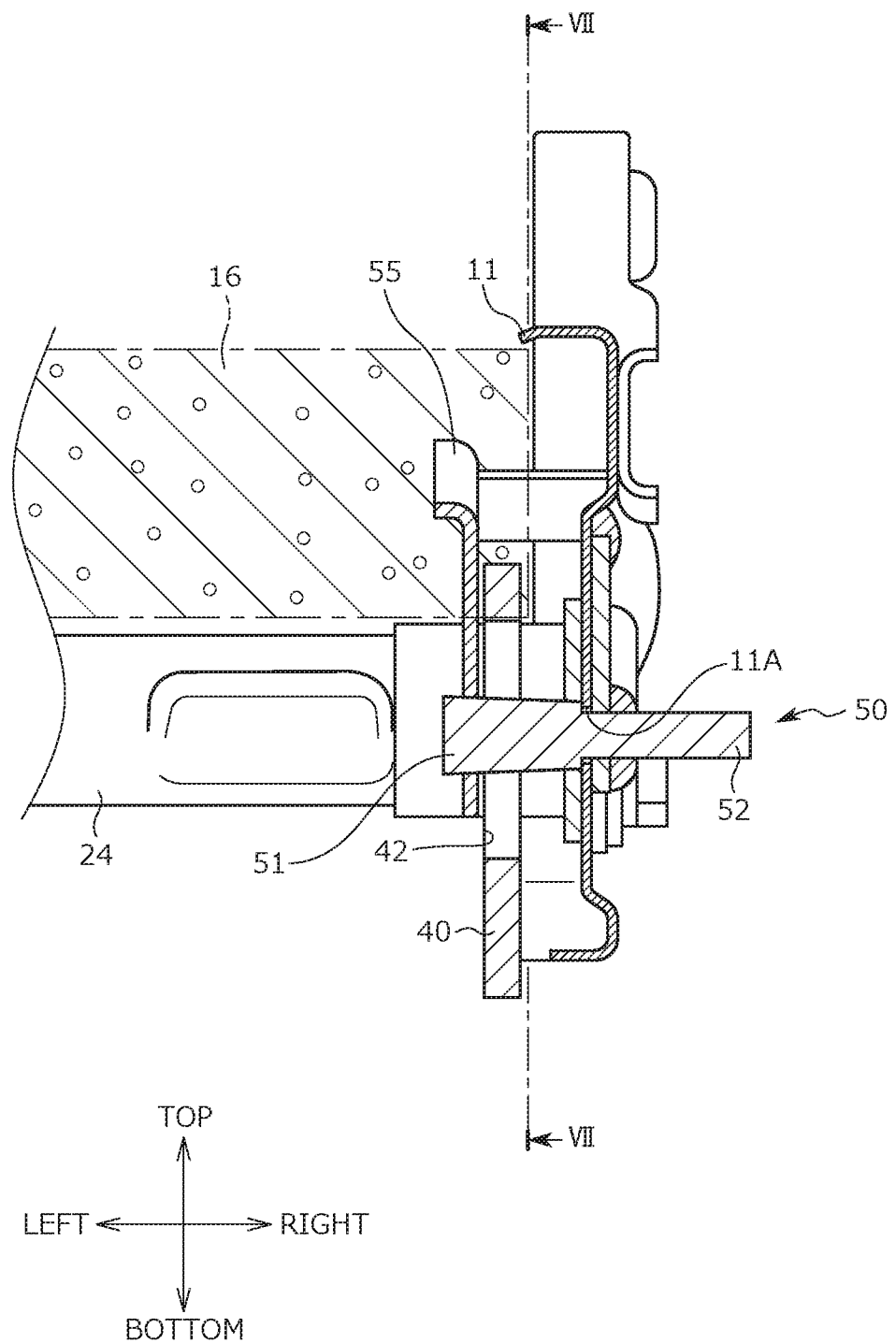
FIG. 6 is a VI-VI cross-sectional view of FIG. 4.

As described above, the link-rotation restricting member 50 is a member which restricts the rotation of the drive link 40, and the link-rotation restricting member 50 protrudes on the seat outer side through the opening portion 42 of the drive link 40 and a through hole 11A of the side frame 11 as shown in FIG. 6 and FIG. 7.

As shown in FIG. 6, the link-rotation restricting member 50 has a large-diameter portion 51 whose diameter is larger than that of the through hole 11A of the side frame 11 and a small-diameter portion 52 whose diameter is smaller than that of the through hole 11A of the side frame 11. Further, in a state where the small-diameter portion 52 of the link-rotation restricting member 50 has been inserted in the through hole 11A of the side frame 11, the link-rotation restricting member 50 is fixed to the fixing bracket 55 and the side frame 11 by welding or the like.

Here, as shown in FIG. 6, the cushion material 1b is arranged on the link-rotation restricting member 50 on the inner side of the side frame 11 in the seat width direction. That is, the cushion material 1b is provided above at least a part of the large-diameter portion 51 of the link-rotation restricting member 50 provided on the inner side of the side frame 11 in the seat width direction.

On the other hand, the cushion material 1b is not provided above the small-diameter portion 52 of the link-rotation restricting member 50 provided on the inner side of the side frame 11 in the seat width direction.

Figure 9:
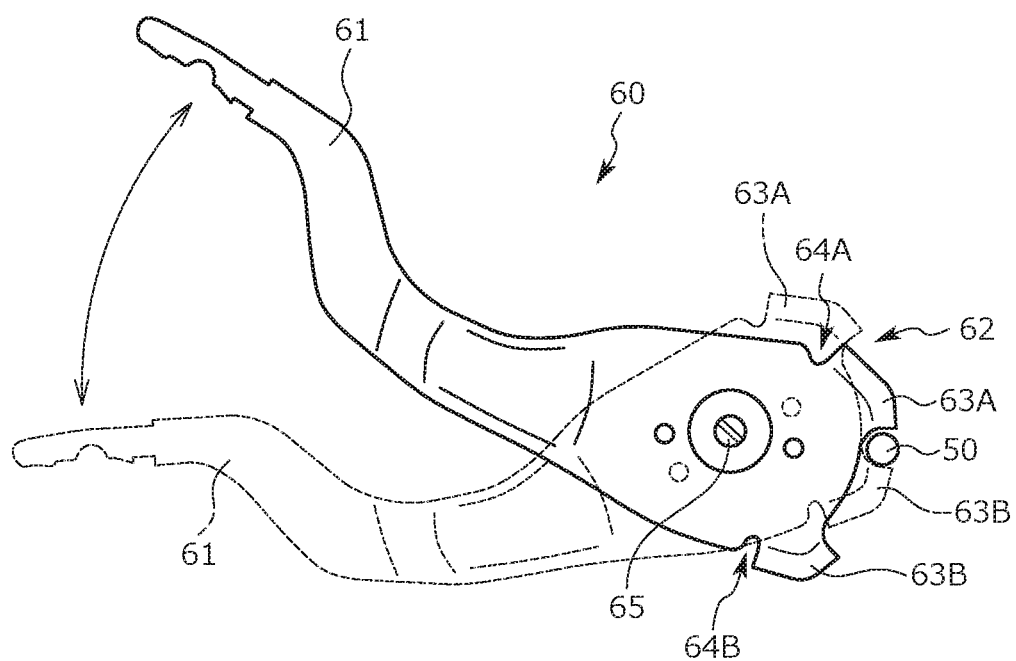
FIG. 9 is a view illustrating an operation range (a rotation range) of an operating section.
Figure 9:
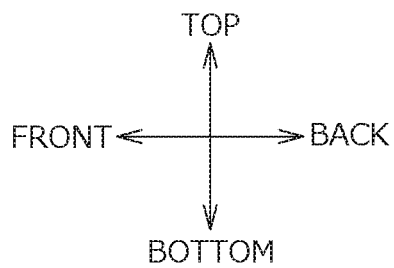

Furthermore, as shown in FIG. 9, when the operating section 61 of the operation member 60 has been pulled up, namely, when the operating section 61 has rotated upward around the rotation shaft 65, the first protruding portion 63A abuts on the link-rotation restricting member 50, whereby the upward movement of the operating section 61 is restricted.

Likewise, when the operating section 61 of the operation member 60 has been pressed down, namely, when the operating section 61 has rotated downward around the rotation shaft 65, the second protruding portion 63B abuts on the link-rotation restricting member 50, whereby the downward movement of the operating section 61 is restricted.

With this configuration, the rotation range (the operation range) of the operating section 61 can be suppressed in a fixed range as shown in FIG. 9.

Moreover, as shown in FIG. 3 and FIG. 4, a shock absorbing section 64 configured to absorb a shock when the first protruding portion 63A and the second protruding portion 63B have abutted on the link-rotation restricting member 50 is provided in the rotation application section 62.

Specifically, in the rotation application section 62, a first notch portion 64A is provided on a side of the first protruding portion 63A opposed to a side facing the second protruding portion 63B (or the link-rotation restricting member 50).

Providing the first notch portion 64A facilitates the bending of the first protruding portion 63A when the first protruding portion 63A has abutted on the link-rotation restricting member 50, thereby improving the shock absorbing properties.

Additionally, in the rotation application section 62, a second notch portion 64B is provided on a side of the second protruding portion 63B opposite to a side facing the first protruding portion 63A (or the link-rotation restricting member 50).

Providing the second notch portion 64B facilitates the bending of the second protruding portion 63B when the second protruding portion 63B has abutted on the link-rotation restricting member 50, thereby improving the shock absorbing properties.

As described above, the first notch portion 64A and the second notch portion 64B formed in the rotation application section 62 function as the shock absorbing section 64.

Consequently, when the rotation application section 62 has abutted on the link-rotation restricting member 50, a shock which is transmitted to an occupant's hands can be alleviated.

[Summary]

The above-described vehicle seat S according to this embodiment is a conveyance seat which enables adjusting the height of the cushion frame 10. The vehicle seat S includes the drive link 40 (an example of the link member) which is rotatably mounted to the cushion frame 10 and moves the cushion frame in the height direction in correspondence with a rotation, the gear part 70 which engages with the drive link 40 and rotates the drive link 40, the link-rotation restricting member 50 which restricts the rotation range of the drive link 40, the operating section 60 which accepts an operation to adjust the height of the cushion frame 10, and the rotation application section 62 which rotates the drive link 40 through the gear part 70 in accordance with an operation of the operating section 60. When the link-rotation restricting member 50 abuts on the rotation application section 62, the movement of the operating section 60 is restricted.

According to the vehicle seat S of this embodiment, the movement of the operating section 60 can be also restricted by the link-rotation restricting member 50 which restricts the rotation range of the drive link 40. Consequently, as compared with a case where a member which restricts the movement of the operating section 60 is provided separately from the link-rotation restricting member 50, the number of components can be reduced.

That is, according to the vehicle seat S of this embodiment, it is possible to reduce the number of components required to restrict the movement of the operating section 60, which is operated when the cushion frame 10 is moved in the height direction, and that of the drive link 40 configured to move the cushion frame 10.

Further, in the vehicle seat S, the rotation application section 62 has the first protruding portion 63A and the second protruding portion 63B which protrude from the outer peripheral portion 66, and the link-rotation restricting member 50 is arranged between the first protruding portion 63A and the second protruding portion 63B. Furthermore, when the first protruding portion 63A and the second protruding portion 63B abut on the link-rotation restricting member 50, the movement of the operating section 60 is restricted.

With this configuration, the rotation range of the rotation application section 62 and the operation range of the operating section 60 can be restricted with the simple configuration.

Moreover, in the vehicle seat S, each of the first protruding portion 63A and the second protruding portion 63B is a flange bent toward the inner side in the seat width direction from the outer peripheral portion 66 of the rotation application section 62.

With this configuration, the rigidity of the first protruding portion 63A and the second protruding portion 63B can be improved. Additionally, protruding the first protruding portion 63A and the second protruding portion 63B toward the inner side in the seat width direction enables arranging the first protruding portion 63A and the second protruding portion 63B at positions where they do not interfere with other members.

Further, in the vehicle seat S, the cushion frame 10 has the side frames 11 arranged on the side portions, and the link-rotation restricting member 50 protrudes outward in the seat width direction from the side frame 11 via the through hole 11A provided in the side frame 11. The operating section 60 and the rotation application section 62 are mounted on one of the right and left side frames 11 to which the link-rotation restricting member 50 is mounted.

Mounting the like-rotation restricting member 50 to the side where a load can be easily applied from the operating section 60 and the rotation application section 62 facilitates the restriction of the movement of the operating section 60 with the use of the link-rotation restricting member 50.

Furthermore, in the vehicle seat S, the rotation application section 62 includes the shock absorbing section 64 configured to absorb a shock when at least one of the first protruding portion 63A and the second protruding portion 63B has abutted on the link-rotation restricting member 50.

With this configuration, it is possible to absorb the shock when at least one of the first protruding portion 63A and the second protruding portion 63B has abutted on the link-rotation restricting member 50. Consequently, when an occupant operates the operating section 60, a shock received when a limit of the operation range has been reached can be eased.

Moreover, in the vehicle seat S, the shock absorbing section 64 has the first notch portion 64A which is formed on the side of the first protruding portion 63A opposite to the side facing the second protruding portion 63B and the second notch portion 64B which is formed on the side of the second protruding portion 63B opposite to the side facing the first protruding portion 63A.

With this configuration, it is possible to absorb a shock when the first protruding portion 63A and the second protruding portion 63B have abutted on the link-rotation restricting member 50 by using the simple configuration. Consequently, when the occupant operates the operating section 60, a shock received when the limit of the operation range has been reached can be further alleviated.

Additionally, the vehicle seat S includes the cushion material 1b arranged on the inner side of the cushion frame 10. The cushion material 1b vertically overlaps a part of the link-rotation restricting member 50 inside the side frame 11 in the seat width direction and the cushion material 1b does not vertically overlap a part of the link-rotation restricting member 50 outside the side frame 11 in the seat width direction.

With this configuration, since the cushion material 1b can be arranged on a necessary portion, an increase in weight can be suppressed.

Other Embodiments

The present invention is not restricted to the foregoing embodiment.

For example, in the foregoing embodiment, the operating section 61 and the rotation application section 62 are integrated as one member, but the operating section 61 and the rotation application section 62 may be configured as different members.

Further, in the foregoing embodiment, both the first protruding portion 63A and the second protruding portion 63B are provided to the rotation application section 62, but only one of them may be provided.

Furthermore, in the foregoing embodiment, both the first notch portion 64A and the second notch portion 64B are provided to the rotation application section 62, but only one of them may be provided.

Vehicle Seat According to Second Embodiment

A vehicle seat according to a second embodiment will now be described. Before giving a description as to the vehicle seat according to the second embodiment, a problem concerning the conveyance seat will be described.

There is a conveyance seat in which a reclining mechanism which tilts a seatback to a seat cushion. For example, Japanese Unexamined Patent Application Publication No. 2016-166020 discloses a mechanism which rotates a reclining shaft inserted in side frames of a seatback by using an actuator.

(Problem Solved by Vehicle Seat according to Second Embodiment)

Meanwhile, in the invention according to the prior art, when the actuator is in contact with a frame member, a vibration in the driving of the actuator is apt to be transmitted through the frame member. Here, a problem is to improve the mounting properties of an elastic member configured to suppress the transmission of the vibration of the actuator.

Means for Solving Problem

In view of the above-described problem, it is an object of the present invention to provide a conveyance seat which can improve the mounting properties of an elastic member configured to reduce a vibration transmitted from an actuator to a frame member.

The problem can be solved by a conveyance seat according to the following second embodiment, the vehicle seat including a pad which supports an occupant, a frame member which abuts on the pad, an actuator mounted to the frame member, and an elastic member which is provided between the frame member and the actuator and abuts on each of the frame member and the actuator, the elastic member having a covering portion which extends toward the actuator and covers a part of the actuator.

According to the conveyance seat, in a state where the actuator is covered with the elastic member arranged between the actuator and the frame member, the actuator can be mounted to the frame member. Consequently, the elastic member arranged between the actuator and the frame member can be easily mounted.

Further, since the actuator is mounted to the frame member through the elastic member, the vibration transmitted from the actuator to the frame member can be reduced.

In the conveyance seat, preferably, the pad has an accommodation space which accommodates the elastic member and the frame member.

With this configuration, the elastic member can be arranged in the accommodation space of the pad.

In the conveyance seat, preferably, the actuator and the elastic member are mounted on the inner side of the frame member in the seat width direction.

With this configuration, the actuator and the elastic member do not protrude from the frame member toward the outside in the seat width direction. Consequently, the conveyance seat can be configured compact in the seat width direction.

In the conveyance seat, preferably, the frame member is a seatback frame including the side frames arranged on the right and left sides, the actuator is mounted to each side frame, the elastic member is arranged between the side frame and the actuator and abut on each of the side frame and the actuator.

As described above, since the elastic member is arranged between the actuator and the side frame, the transmission of the vibration to the side frame can be suppressed.

In the conveyance seat, preferably, the side frame has a through hole pierced in the seat width direction, the actuator has a bolt inserted in the through hole, the elastic member is mounted to the bolt, and the side frame is sandwiched between a fastening member mounted to the bolt and the elastic member.

With this configuration, when the actuator is fastened to the frame member from the outer side in the seat width direction by the fastening member, damage on the elastic member can be suppressed.

In the conveyance seat, preferably, the side frame has a concave portion which is recessed toward the inner side in the seat width direction, and the actuator is mounted in the concave portion.

With this configuration, a length of the bolt of the actuator protruding from the outer side of the side frame can be shortened. Consequently, an interference of the bolt of the actuator with members in the seat can be suppressed.

Furthermore, since the actuator can be mounted to a high-rigidity portion of the side frame, the vibration of the side frame can be effectively suppressed.

In the conveyance seat, preferably, an airbag module mounted to the side frame is provided, and a portion on the side frame to which the airbag module is mounted is a position other than the concave portion.

With this configuration, it is possible to suppress the transmission of the vibration of the actuator to the airbag module mounting portion. Consequently, an erroneous operation of an airbag can be prevented, and the airbag can be safely unfolded.

In the conveyance seat, preferably, the side frame has a bead, and an upper end of the concave portion is placed between the bead and the through hole.

Since the bead is formed on the side frame this manner, the rigidity of the side frame can be improved.

In the conveyance seat, preferably, the seatback frame has a lower frame which couples lower portions of the right and left side frames, and the elastic member does not abut on the lower frame.

With this configuration, a through hole configured to mount the actuator to the lower frame does not have to be formed. Thus, the design freedom can be improved. Moreover, since a length of the lower frame in the seat width direction can be shortened, a size of the lower frame can be reduced.

In the conveyance seat, preferably, a pressure receiving member mounted to the seatback frame is provided, the pressure receiving member has a first mounting portion mounted to the seatback frame and a second mounting portion placed below the first mounting portion and mounted to the seatback frame, and the elastic member is arranged between the first mounting portion and the second mounting portion in the up-and-down direction.

With this configuration, it is possible to suppress the transmission of the vibration to the first mounting portion and the second mounting portion of the pressure receiving member through the seatback frame.

(Effects of Conveyance Seat according to Second Embodiment)

According to the conveyance seat of the following second embodiment, the vibration transmitted from the actuator to the frame member can be reduced.

According to the conveyance seat of the following second embodiment, the elastic member can be arranged in the accommodation space of the pad.

According to the conveyance seat of the following second embodiment, the conveyance seat can be configured compact in the seat width direction.

According to the conveyance seat of the following second embodiment, the transmission of the vibration to the side frame can be suppressed.

According to the conveyance seat of the following second embodiment, when the actuator is fastened to the frame member from the outer side in the seat width direction by the fastening member, the damage to the elastic member can be suppressed.

According to the conveyance seat of the following second embodiment, the interference of the bolt of the actuator with the members in the seat can be suppressed.

According to the conveyance seat of the following second embodiment, the transmission of the vibration of the actuator to the mounting portion of the airbag can be suppressed.

According to the conveyance seat of the following second embodiment, the rigidity of the side frame can be improved.

According to the conveyance seat of the following second embodiment, the size of the lower frame can be reduced.

According to the conveyance seat of the second embodiment, the transmission of the vibration from the pressure receiving member to the occupant can be suppressed.

A description will be given below on a vehicle seat S200 as the conveyance seat according to the second embodiment of the present invention (which will be referred to as a second embodiment hereinafter) with reference to FIG. 10 to FIG. 17.

In the second embodiment, as an example of the vehicle seat S200, a vehicle seat mounted in a vehicle will be described, but it may be a seat mounted in an aircraft or a ship which travels on a place other than the ground without being restricted to a vehicle seat mounted in a ground traveling vehicle with wheels such as an automobile or a railcar.

It is to be noted that the second embodiment described below is just an example which facilitates the understanding of the present invention, and it does not restrict the present invention. That is, shapes, dimensions, arrangements, and others of members described below can be modified or improved without deviating from the purpose of the present invention, and it is needless to say that their equivalents are included in the present invention.

It is to be noted that "up-and-down", "front-to-back", and "right-and-left" directions in the following description coincide with "up-and-down", "front-to-back", and "right-and-left" directions when seen from an occupant of the vehicle seat S200, respectively.

[Configuration of Vehicle Seat S200]

Figure 10:
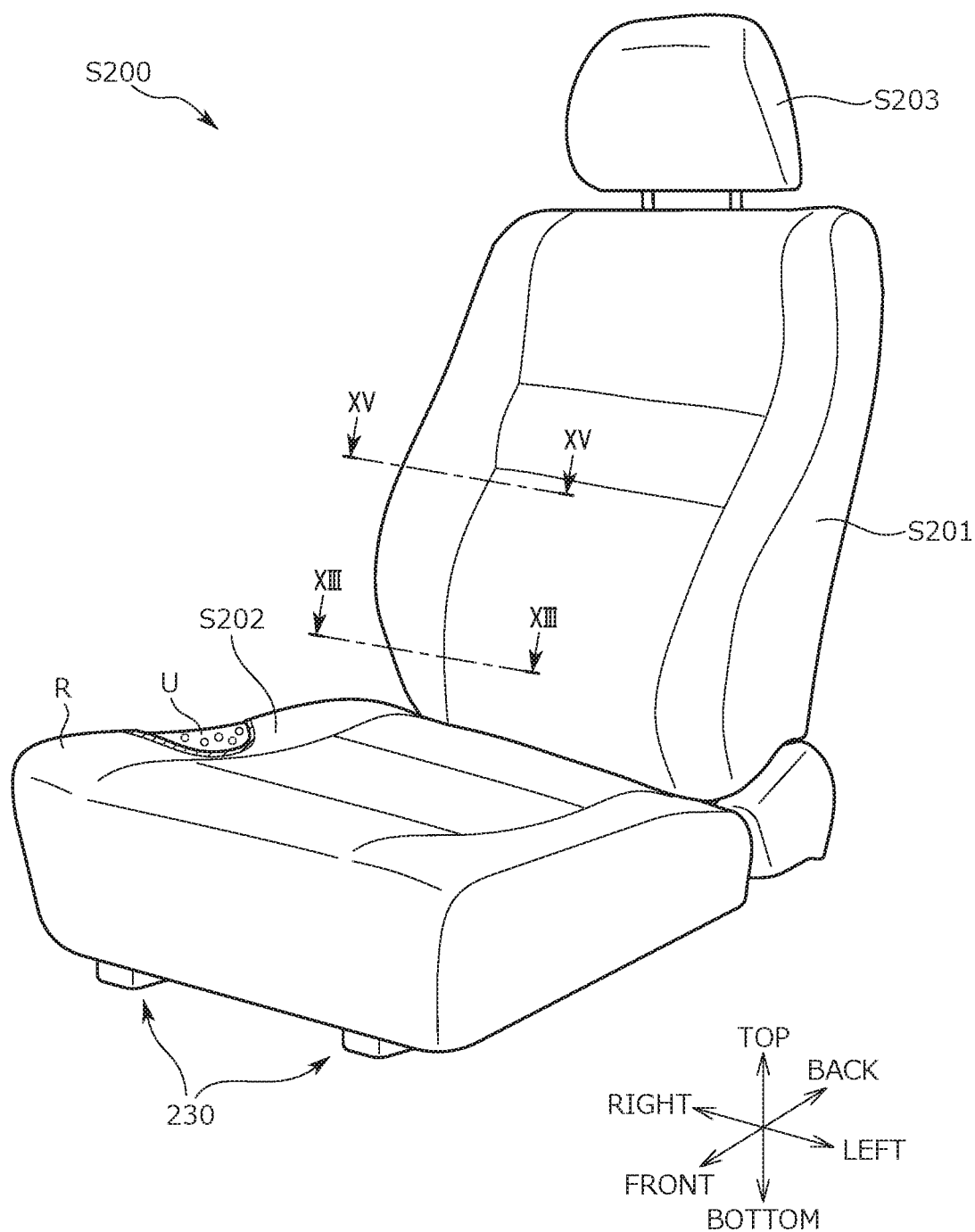
FIG. 10 is a perspective view of a seat according to a second embodiment.

The vehicles seat S200 according to the second embodiment has an appearance shown in FIG. 10. It is to be noted that, in FIG. 10, a part of the vehicle seat S200 (which is specifically a front end corner portion of a seat cushion S202) is shown as a configuration with a surface skin material R removed therefrom for the convenience of illustration.

The vehicle seat S200 has, as main constituent elements, a seatback S201 which becomes a backrest part supporting the back of a seat occupant, the seat cushion S202 which becomes a sitting part supporting the buttocks of the seat occupant, and a headrest S203 which is arranged above the seatback S201 and supports the head of the seat occupant.

Figure 11:
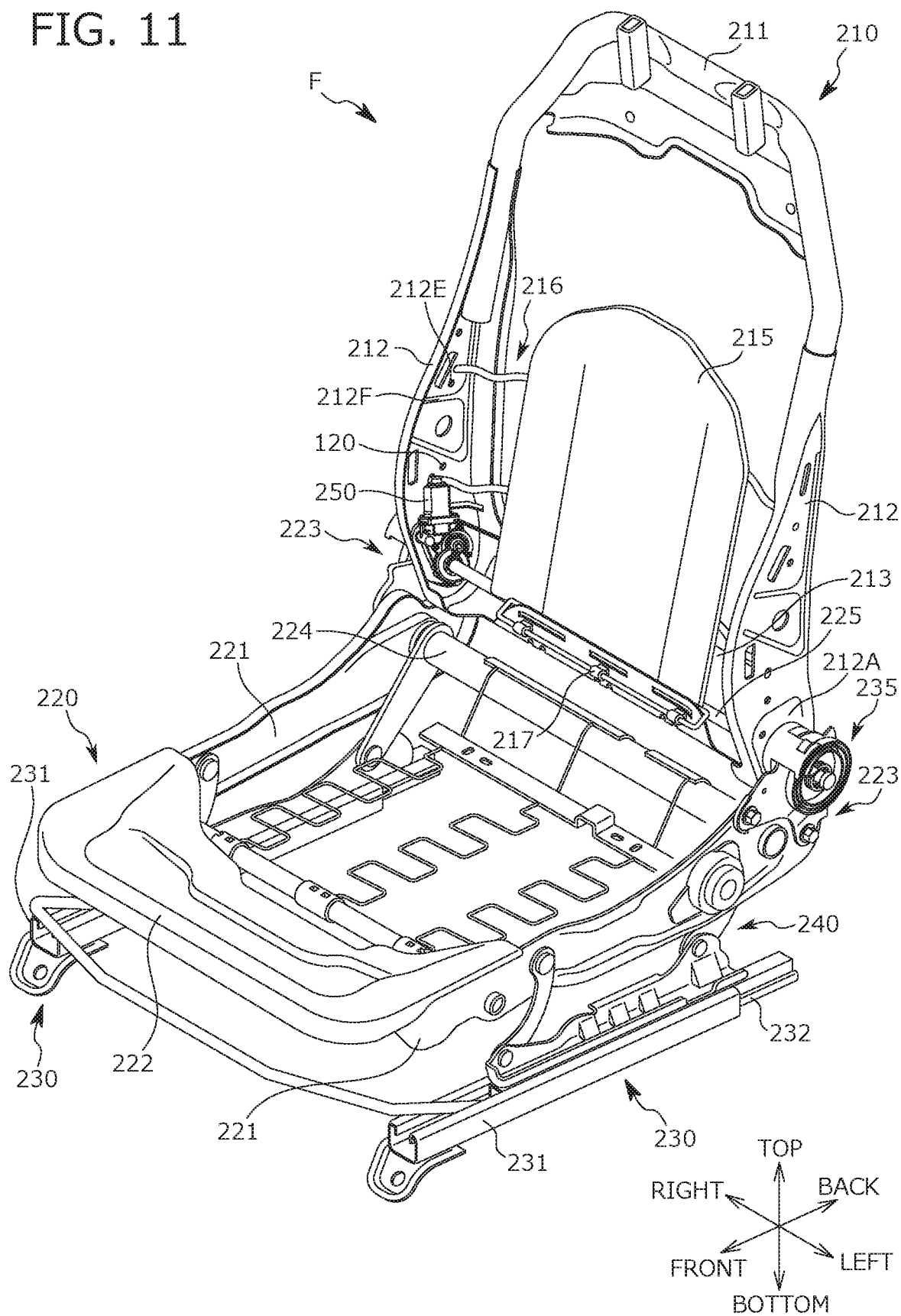
FIG. 11 is a perspective view of a seat frame.

The seatback S201 is constituted by mounting a pad U on a seatback frame 210 which forms a framework shown in FIG. 11 and covering it with the surface skin material R.

The seat cushion S202 is constituted by mounting the pad U on a seat cushion frame 220 which forms a framework shown in FIG. 11 and covering it with the surface skin material R.

The headrest S203 is constituted by arranging a non-illustrated cushion material on a non-illustrated core material and covering it with the surface skin material R.

It is to be noted that the surface skin material R provided on the vehicle seat S200 is made of a material such as cloth or leather.

Furthermore, the pad U is an urethane base material molded by foam molding with the use of, e.g., an urethane foaming material.

[Configuration of Seat frame F]

A description will now be given on the configuration of a seat frame F as a frame member which becomes the framework of the vehicle seat S200 with reference to FIG. 11.

As shown in FIG. 11, the seat frame F is mainly constituted of the seatback frame 210 and the seat cushion frame 220. The seatback frame 210 forms a framework of the seatback S201, and the seat cushion frame 20 forms a framework of the seat cushion S202.

As shown in FIG. 11, the seatback frame 210 includes an inverted U-shaped upper frame 211, a pair of side frames 212 forming right and left end portions in a seat width direction, and a lower frame 213 which couples lower end portions of the pair of side frames 212 with each other.

The upper frame 211 is welded to the side frames 212 at lower portions of the upper frame 211 on both sides.

Furthermore, a headrest mounting portion is mounted to an upper end of the upper frame 211 by welding. The headrest mounting portion is a tubular body into which two headrest stays suspended from the headrest S203 are inserted.

As shown in FIG. 11, a rotation shaft 225 of a reclining mechanism 235 is mounted between the lower end portions of the right and left side frames 212 in a state where the rotation shaft 225 pierces through the right and left side frames 212.

Figure 12:
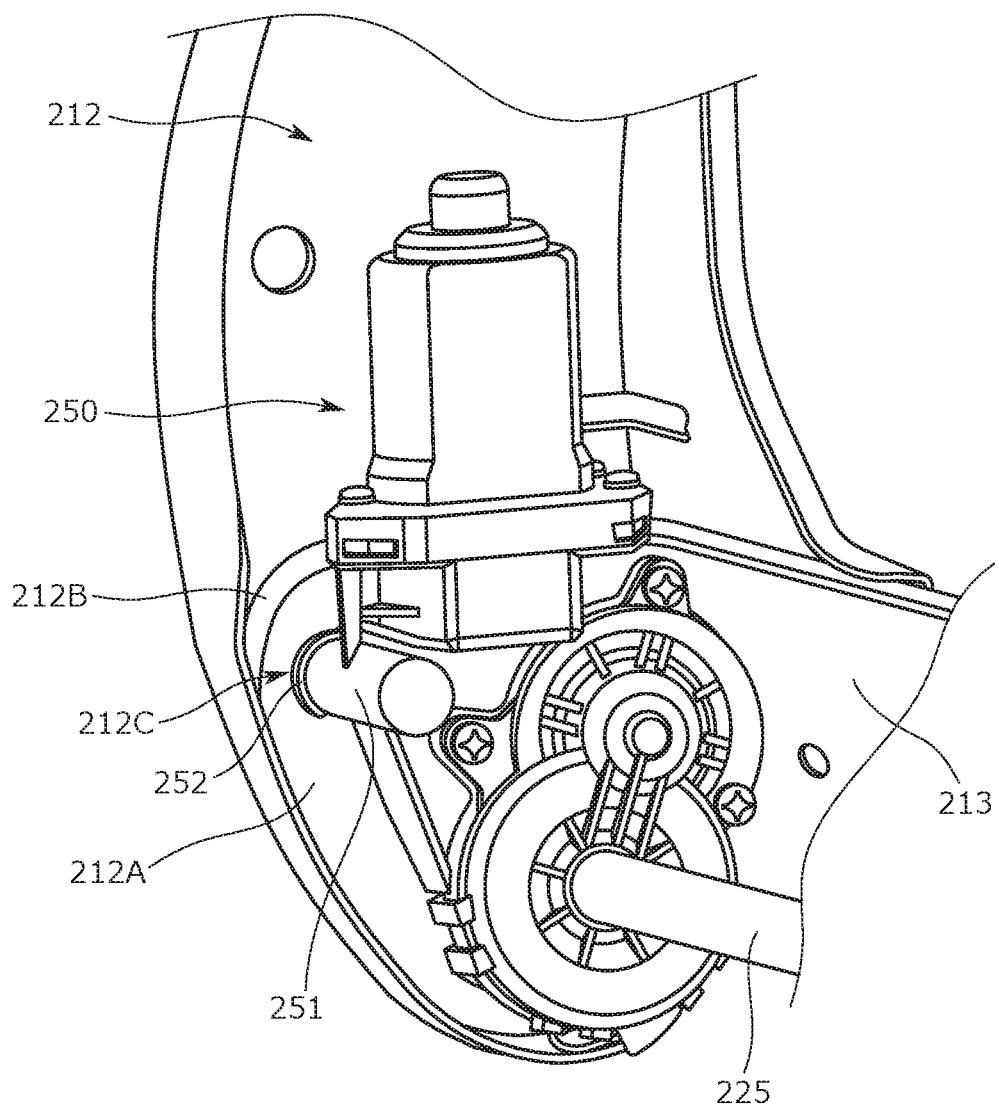
FIG. 12 is an enlarged view of a mounting portion of an actuator.

As shown in FIG. 11 and FIG. 12, the rotation shaft 225 rotates by power given by an actuator 250. Giving a specific description, the rotation shaft 225 is inserted into an insertion hole formed in the actuator 250 and engages with an output shaft of the actuator 250. Thus, when the output shaft of the actuator 250 turns, the rotation shaft 225 inserted in the output shaft turns. As a result, driving force of the actuator 250 is transmitted to the reclining mechanism 235 through the rotation shaft 225, and the reclining mechanism 235 finally operates.

It is to be noted that operating a non-illustrate reclining operating section causes driving the actuator 250. Consequently, the reclining mechanism 235 is operated, and an angle of the seatback S201 to the seat cushion S202 can be adjusted.

Moreover, the side frame 212 is a tabular frame having a U-shaped cross section, and a concave portion 212A is formed below a flat plate portion which serves as a side plate.

The concave portion 212A is a portion formed by denting the flat plate portion of the side frame 212 inward in the seat width direction.

Figure 13:
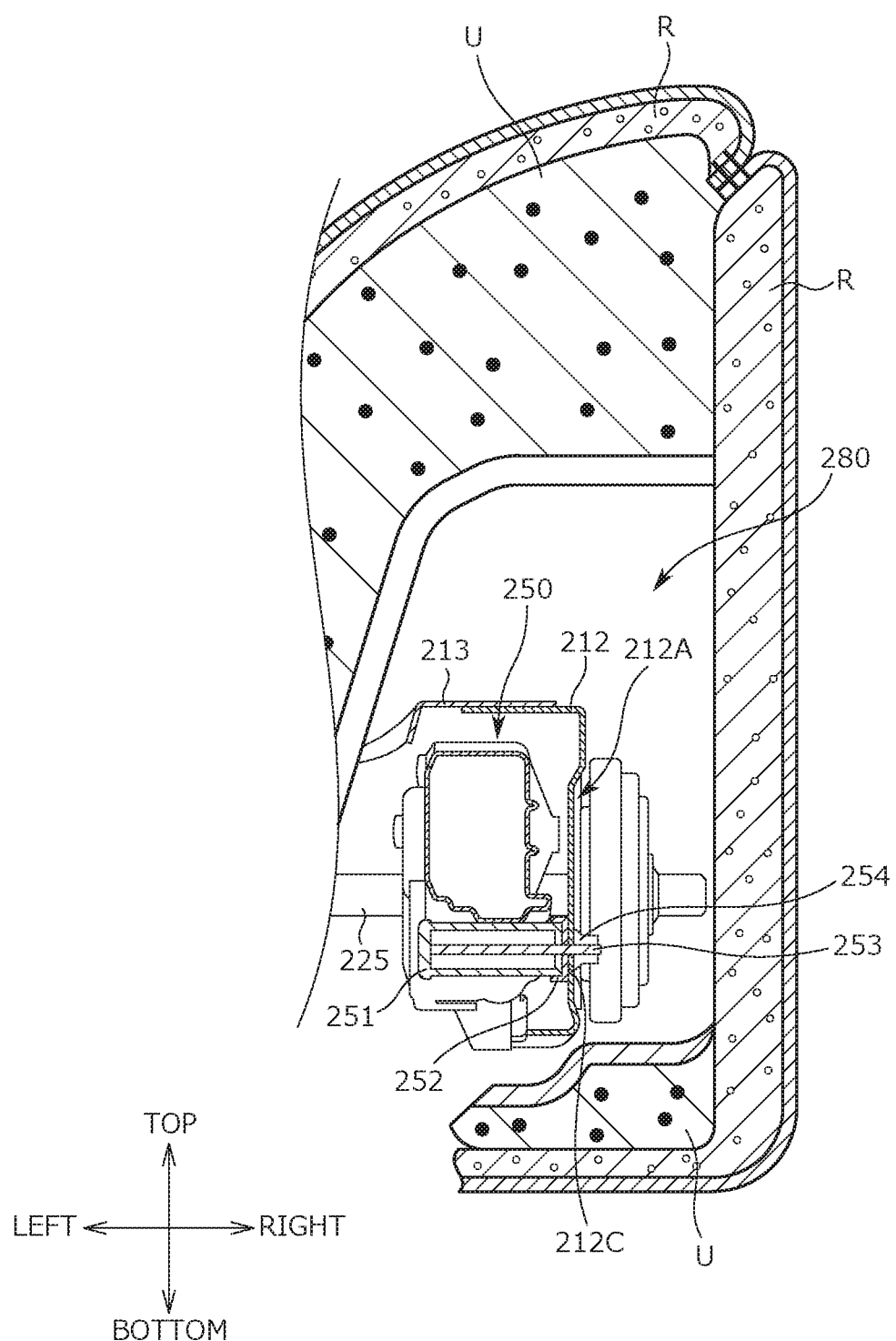
FIG. 13 is a IV-IV cross-sectional view of FIG. 10.
Figure 17:
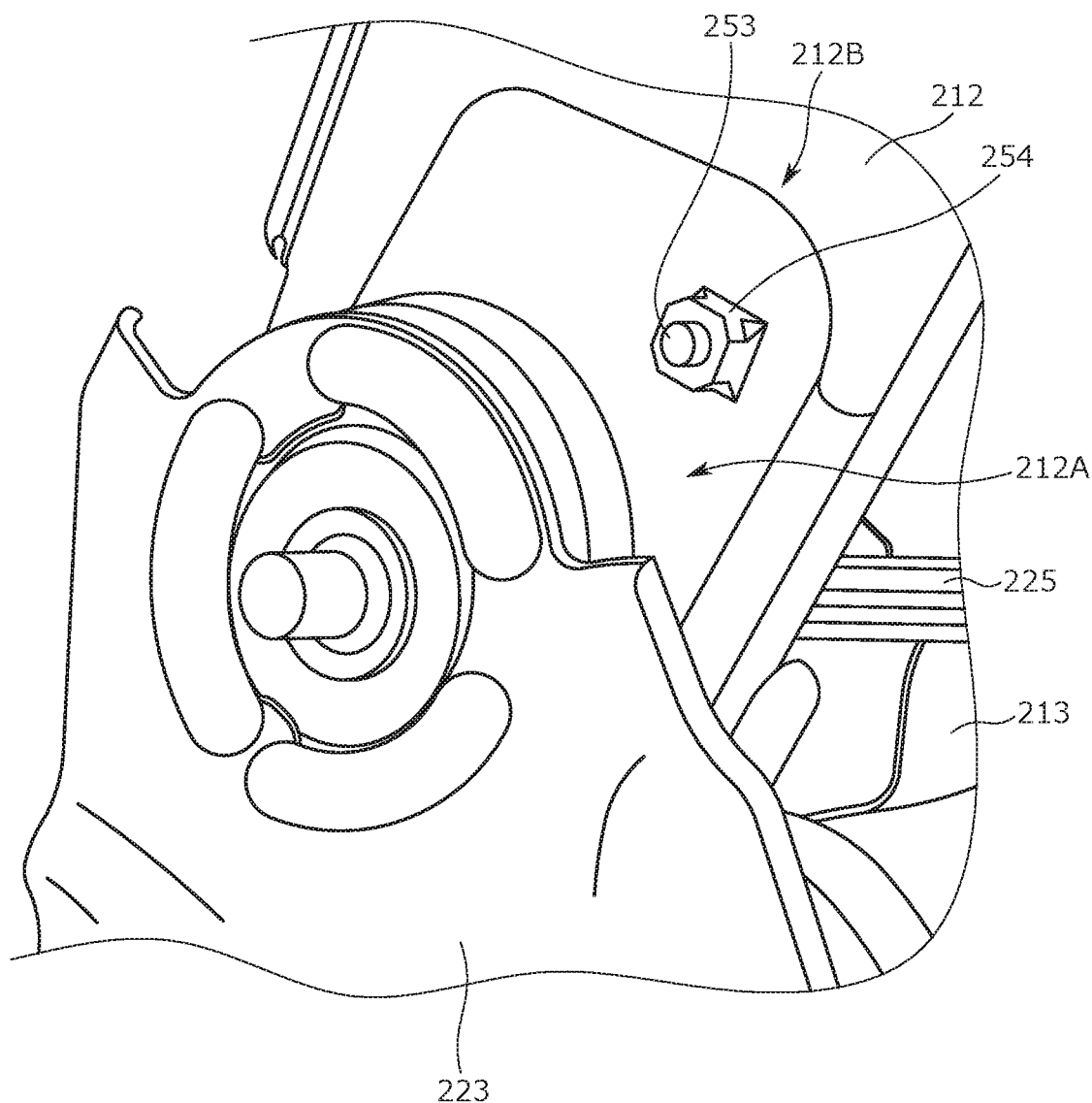
FIG. 17 is a view showing a state of the side frame having the actuator mounted thereto.
Figure 17:
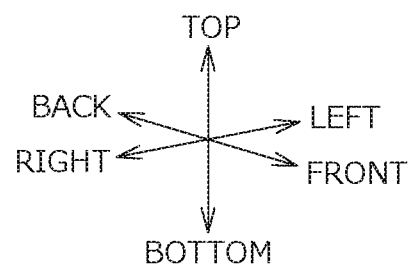

Additionally, as shown in FIG. 11, FIG. 13, and FIG. 17, a through hole 212C is formed in the concave portion 212A, and a bolt 253 extending outward in the seat direction from a mounting portion 251 of the actuator 250 is inserted into the through hole 212C.

It is to be noted that an elastic member 252 which has an outer shape slightly larger than the cylindrical mounting portion 251 and has a hole, into which the bolt 253 can be inserted, formed at the center thereof is disposed to the bolt 253. The elastic member 252 is a cap-shaped member disposed in a state where it covers an end portion of the mounting portion 251. For example, the elastic member 252 is made of rubber.

Figure 14:
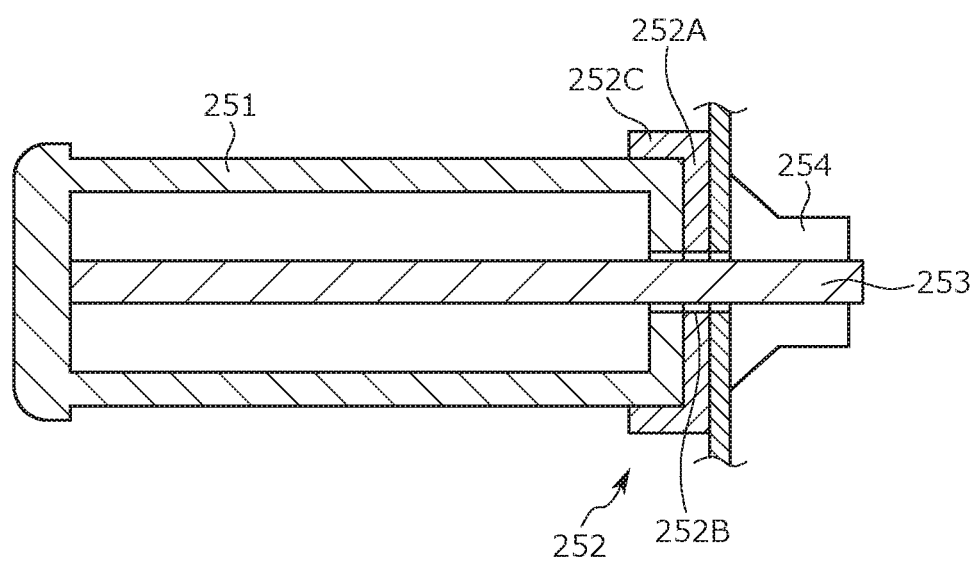
FIG. 14 is an enlarged view of the mounting portion of the actuator in FIG. 13.

Specifically, as shown in FIG. 14, the elastic member 252 has an abutting portion 252A arranged between the mounting portion 251 and the side frame 212, a through hole 252B which is provided in the abutting portion 252A and into which the bolt 253 is inserted, and a covering portion 252C which extends from the abutting portion 252A toward the actuator 250 and covers a part of the mounting portion 251.

Further, in a state where the bolt 253 is inserted into the through hole 252B of the elastic member 252 and the covering portion 252C of the elastic member 252 is fitted on the mounting portion 251, the bolt 253 is inserted into the through hole 212C of the side from 212 from the inner side in the seat width direction. Furthermore, a nut 254 as a fastening member is fastened to an end portion of the bolt 253 protruding from the side frame 212 to the outer side in the seat width direction.

It is to be noted that, in a state where the elastic member is mounted to cover the mounting portion 251 of the actuator 250 as described above, the actuator 250 can be mounted on the side frame 212. Consequently, the elastic member 252 hardly comes off the actuator 250. Moreover, when the elastic member 252 has been put on the mounting portion 251 of the actuator 250, the covering portion 252C of the elastic member 252 can be visually confirmed from various angles, and hence whether the elastic member 252 has been mounted can be easily confirmed.

When the actuator 250 is fixed to the side frame 212 at a position other than the rotation shaft 225 in this manner, the fixation of the actuator 250 can be strengthened.

Further, the actuator 250 is not in direction contact with the side frame 212. That is, the elastic member 252 is arranged between the actuator 250 and the side frame 212. In other words, a surface of the elastic member 252 on the inner side in the seat width direction abuts on the mounting portion 251 of the actuator 250, and a surface of the elastic member 252 on the outer side in the seat width direction abuts on the side frame 212.

When the actuator 250 is mounted on the side frame 212 through the elastic member 252 in this manner, the vibration of the actuator 250 is hardly transmitted to the side frame 212.

Further, the elastic member 252 is arranged on the inner side of the side frame 212 in the seat width direction. That is, the side frame 212 is sandwiched between the elastic member 252 and the nut 254. With this configuration, since the nut 254 screwed to the bolt 253 does not directly come into contact with the elastic member 252, the elastic member 252 can be prevented from being damaged by the nut 254 at the time of the fastening using the nut 254.

It is to be noted that, as shown in FIG. 12, the mounting portion 251 of the actuator 250 is mounted on the side frame 212 but, on the other hand, it is not mounted on the lower frame 213. Since the mounting portion 251 of the actuator 250 is mounted on the side frame 212 alone in this manner, the vibration is hardly transmitted from the mounting portion 251 to the lower frame 213.

Further, as shown in FIG. 13, the actuator 250 is accommodated in an accommodation space 280 formed in the pad U.

Figure 15:
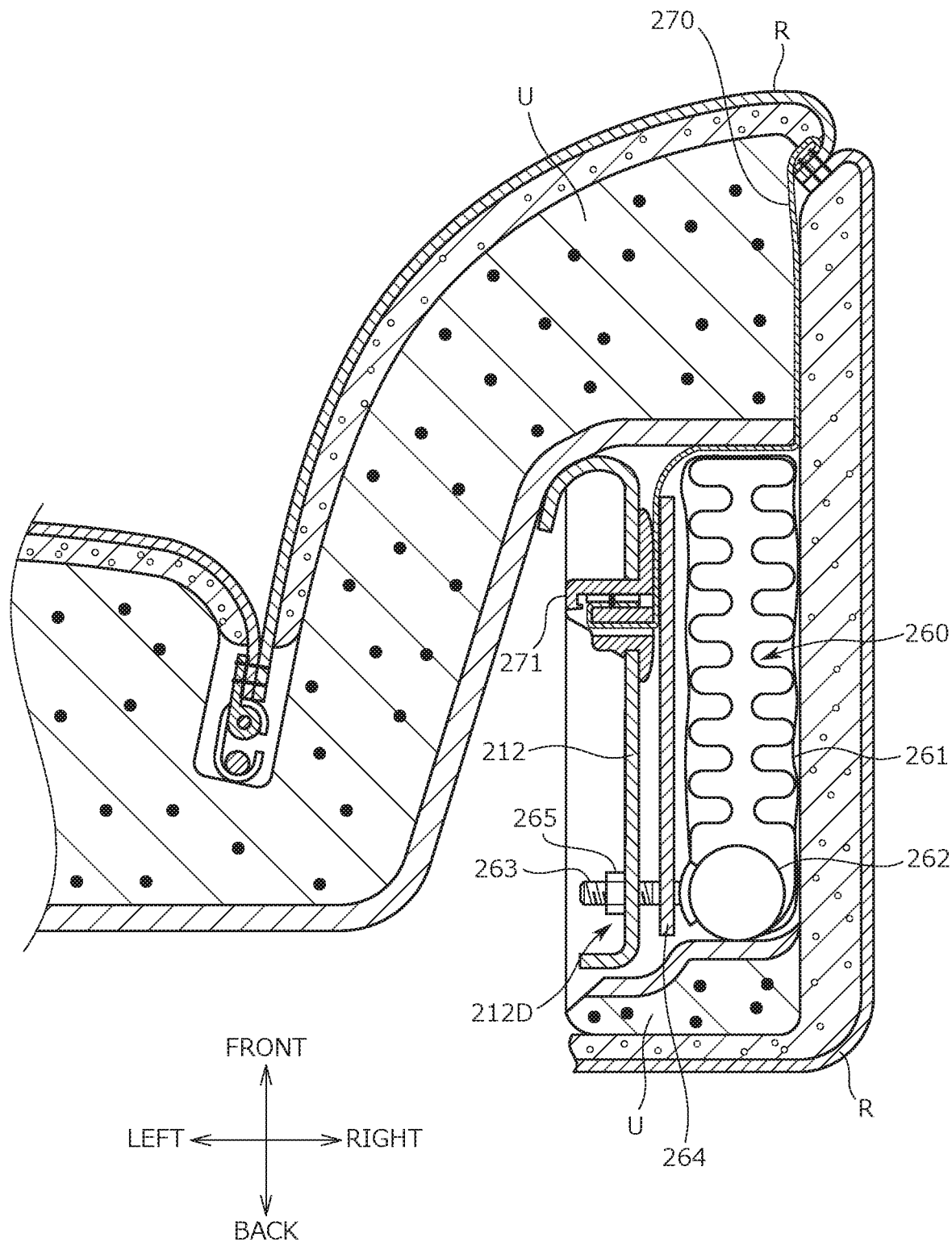
FIG. 15 is a VI-VI cross-sectional view of FIG. 10.
Figure 16:
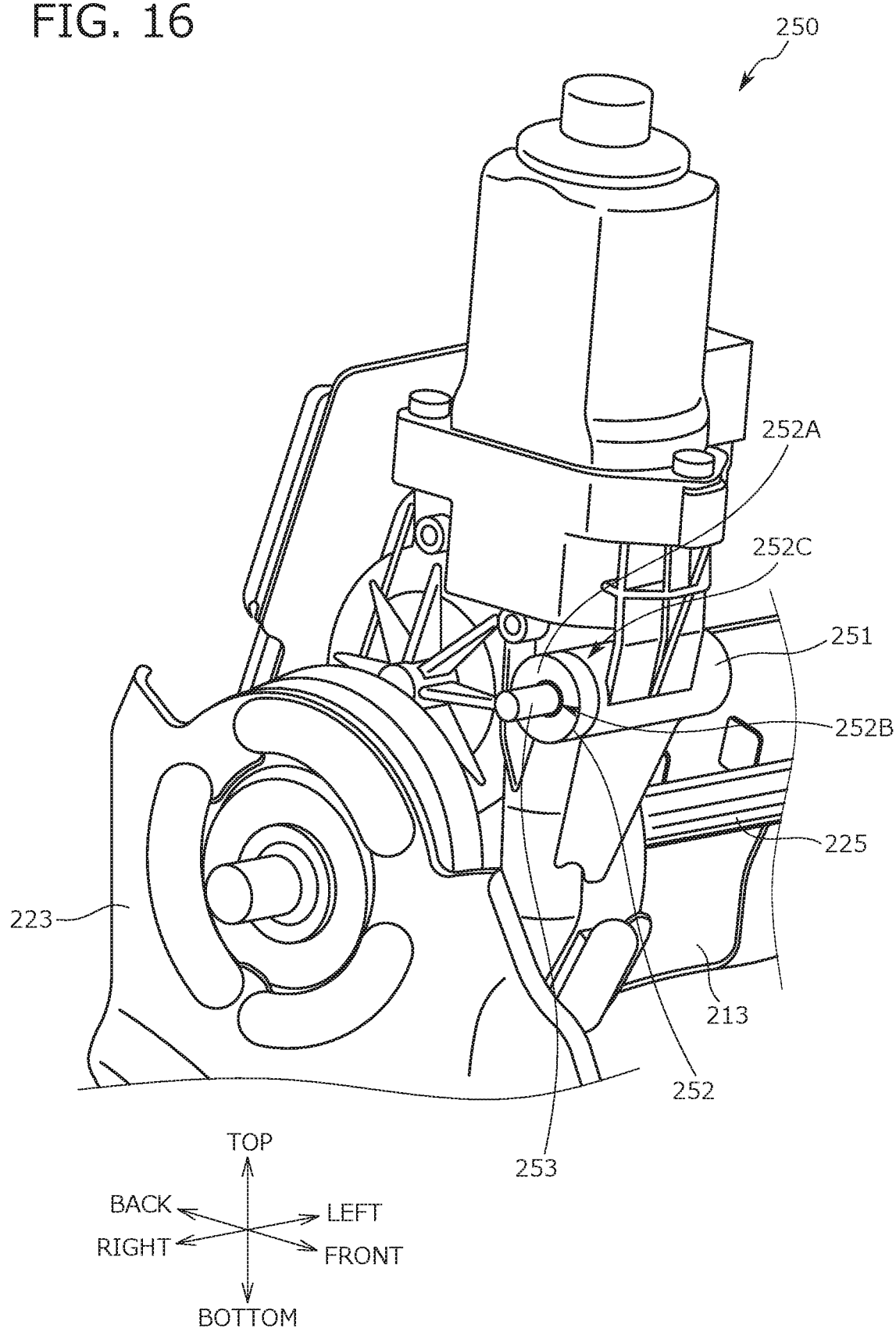
FIG. 16 is a block diagram of a side of the actuator facing a side frame.

Furthermore, as shown in FIG. 10 and FIG. 15, an airbag module 260 is mounted on the outer side of the side frame 212 in the seat width direction.

Specifically, as shown in FIG. 11, an airbag mounting hole 212D and an airbag mounting hole 212E are formed in the flat plate portion of the side frame 212, and the airbag module 260 is mounted in the airbag mounting hole 212D and the airbag mounting hole 212E.

Here, as shown in FIG. 15, the airbag module 260 has, as main constituents, an airbag 261, an inflator 262, a stud bolt 263, and a retainer 264.

The airbag module 260 is fixed to the side frame 212 in the following manner. The stud bolt 263 extends from the inflator 262 toward the inner side in the seat width direction. Furthermore, in a state where the stud bolt 263 has been inserted in the airbag mounting hole 212D of the side frame 212, when a nut 265 is screwed and fastened from the inner side in the seat width direction, the airbag module 260 is mounted to the side frame 212.

Giving a description on an operation of the airbag module 260, the inflator 262 generates a gas by accepting an operation signal in correspondence with a collision of a vehicle, and the airbag 261 inflates upon accepting injection of the gas generated by the inflator 262. At this time, when stay cloth 270 held by an end portion of the surface skin material R and a stay cloth mounting clip 271 fixed to the side frame 212 is pressed, the end portion of the surface skin material R is fractured, and the airbag 261 inflates and expands from a fractured portion to the outside of the seatback S201.

It is to be noted that, as shown in FIG. 11, in the vehicle seat S200 according to the second embodiment, the airbag mounting hole 212D and the airbag mounting hole 212E configured to mount the airbag module 260 are provided at positions different from that of the concave portion 212A.

In other words, the airbag mounting hole 212D and the airbag mounting hole 212E configured to mount the airbag module 260 are formed at positions higher than that of a step portion 212B which is an upper end of the concave portion 212A of the side frame 212.

Furthermore, as shown in FIG. 11, an inverted F-shaped bead 212F is formed on the flat plate portion of the side frame 212, whereby the strength of the flat plate portion of the side frame 212 is improved.

Moreover, the step portion 212B of the side frame 212 is placed between a lower end of the seat frame F and the concave portion 212A of the side frame 212. That is, an upper end of the concave portion 212A is placed between the lower end of the seat frame F and the concave portion 212A of the side frame 212.

Additionally, the airbag mounting hole 212D and the airbag mounting hole 212E are formed at positions across the bead 212F, and the strength of the mounting portion of the airbag module 260 is thereby improved.

Further, as shown in FIG. 11, a pressure receiving member 215 which receives a load from an occupant is installed at a central portion of the seatback frame 210. Specifically, the pressure receiving member 215 is supported by the seatback frame 210 on a first mounting portion 216 and a second mounting portion 217.

Here, the pressure receiving member 215 supports the back of an occupant, and is constituted of an elastic member such as a leaf spring or an S spring.

The first mounting portion 216 is a member locked to the side frame 212. Further, the first mounting portion 216 may be locked to the upper frame 211 provided above the pressure receiving member 215 or a cross member which is installed on the upper frame 211.

The second mounting portion 217 is a member which is provided below the first mounting portion 216 and locked to the lower frame 213 coupling the right and left side frames 212.

In this manner, the pressure receiving member 215 is fixed to the seatback frame 210 by the first mounting portion 216 and the second mounting portion 217.

It is to be noted that the elastic member 252 is arranged between the first mounting portion 216 and the second mounting portion 217 in the up-and-down direction. With this configuration, the vibration of the actuator 250 is hardly transmitted to the pressure receiving member 215 through the first mounting portion 216 and the second mounting portion 217.

A description will now be given on the seat cushion frame 220.

As shown in FIG. 11, the seat cushion frame 220 has an outer shape which is a square frame shape when viewed from above. Furthermore, the seat cushion frame 220 has, as main constituent elements, right and left cushion side frames 221 constituting right and left end portions in the seat width direction respectively, a pan frame 222 coupling front end portions of the right and left cushion side frames 221 with each other, and a coupling pipe 224 coupling rear end portions of the right and left cushion side frames 221 with each other. For example, the coupling pipe 224 is a hollow member such as a round pipe.

It is to be noted that the seatback frame 210 is coupled with the seat cushion frame 220 through the reclining mechanisms 235 and coupling brackets 223, and an angle of the seat back frame 210 to the seat cushion frame 220 can be adjusted by the reclining mechanisms 235 as described above.

Moreover, the seat cushion frame 220 is coupled with slide mechanisms 230 through height mechanisms 240.

Each of the slide mechanisms 230 has, as main constituent elements, a lower rail 231 fixed to a vehicle body floor and an upper rail 232 which slides back and forth on the lower rail 231.

The height mechanisms 240 are mounted on the upper rails 232, and the seat frame F slides with the upper rails 232 on the lower rails 231 when the upper rails 232 slide on the lower rails 231, respectively.

Additionally, each height mechanism 240 has a plurality of links, and electrically or manually rotating the links enables adjusting a height of the seat cushion frame 220 to the vehicle body floor (or the upper rails 232). It is to be noted that a well-known mechanism can be used as each height mechanism 240, and hence its particulars will be omitted.

As described above, in the vehicle seat S according to the second embodiment, the elastic member 252 is mounted on the mounting portion 251 of the actuator 250, and the actuator 250 is mounted on the side frame 212 through the elastic member 252. Consequently, the transmission of the vibration of the actuator 250 to the seatback frame 210 including the side frames 212 can be suppressed.

[Summary]

The vehicle seat S200 (an example of the conveyance seat) according to the second embodiment has the pad U which supports an occupant, the seat frame F (an example of the frame member) which abuts on the pad U, the actuator 250 mounted on the seat frame F, and the elastic member 252 which is provided between the seat frame F and the actuator 250 and abuts on each of the seat frame F and the actuator 250, and the elastic member 252 extends toward the actuator 250 and has the covering portion 252C which covers a part of the actuator 250.

According to the vehicle seat S200, in a state where the elastic member 252 arranged between the actuator 250 and the seat frame F has been put on the actuator 250, the actuator 250 can be mounted on the seat frame F. Consequently, the mounting of the elastic member 252 arranged between the actuator 250 and the seat frame F can be facilitated.

Further, since the actuator 250 is mounted on the seat frame F through the elastic member 252, the vibration transmitted from the actuator 250 to the seat frame F can be reduced.

In the vehicle seat S200, the pad U has the accommodation space 280 in which the elastic member 252 and the side frame 212 are accommodated.

With this configuration the elastic member 252 can be arranged in the accommodation space 280 of the pad U.

In the vehicle seat S200, the actuator 250 and the elastic member 252 are mounted on the inner side of the seat frame F in the seat width direction.

With this configuration, the actuator 250 and the elastic member do not protrude from the seat frame F toward the outer side in the seat width direction. As a result, the vehicle seat S200 can be configured compact in the seat width direction.

In the vehicle seat S200, the frame member is the seatback frame 210 including the side frames 212 arranged on the right and left sides. The actuator 250 is mounted on each side frame 212, and the elastic member 252 is provided between the side frame 212 and the actuator 250 and abuts on each of the side frame 212 and the actuator 250.

Providing the elastic member 252 between the actuator 250 and the side frame 212 in this manner enables suppressing the transmission of the vibration to the side frame 212.

In the vehicle seat S200, the side frame 212 has the through hole 212C pierced in the seat width direction, and the actuator 250 has the bolt 253 inserted into the through hole 212C. The elastic member 252 is mounted to the bolt 253, and the side frame 212 is sandwiched between the nut 254 (an example of the fastening member) mounted to the bolt 253 and the elastic member 252.

With this configuration, when the actuator 250 is fastened to the frame member from the outer side in the seat width direction by the nut 254, the damage given to the elastic member can be suppressed.

In the vehicle seat S200, the side frame 212 has the concave portion 212A recessed inward in the seat width direction, and the actuator 250 is mounted on the concave portion.

With this configuration, a protruding length of the bolt 253 of the actuator 250 from the outer side of the side frame 212 can be shortened. Consequently, the interference of the bolt 253 of the actuator 250 with the members in the seat can be suppressed.

Furthermore, since the actuator 250 can be mounted on the high-rigidity portion of the side frame 212, the vibration of the side frame 212 can be effectively suppressed.

In the vehicle seat S200, the airbag module 260 mounted on the side frame 212 is provided, and a portion of the side frame 212 on which the airbag module 260 is mounted is a position other than the concave portion 212A.

With this configuration, it is possible to suppress the transmission of the vibration of the actuator 250 to the mounting portion for the airbag module 260. Consequently, an erroneous operation of the airbag can be prevented, and the airbag can be stably unfolded.

In the vehicle seat S200, the side frame 212 has the bead 212F, and the upper end of the concave portion 212A (the step portion 212B) is placed between the bead 212F and the through hole 212C.

Forming the bead 212F on the side frame 212 in this manner enables improving the rigidity of the side frame 212.

In the vehicle seat S200, the seatback frame 210 has the lower frame 213 which couples the lower portions of the right and left side frames 212 with each other, and the elastic member 252 does not abut on the lower frame 213.

With this configuration, a through hole for mounting the actuator 250 on the lower frame 213 does not have to be formed. Thus, the design freedom of the lower frame 213 can be improved. Furthermore, since the length of the lower frame 213 in the seat width direction can be shortened, the size of the lower frame 213 can be reduced.

The vehicle seat S200 has the pressure receiving member 215 which is mounted on the seatback frame 210. The pressure receiving member 215 has the first mounting portion 216 which is mounted on the seatback frame 210 and the second mounting portion 217 which is placed below the first mounting portion 216 and mounted on the seatback frame 210. The elastic member 252 is arranged between the first mounting portion 216 and the second mounting portion 217 in the up-and-down direction.

With this configuration, it is possible to suppress the transmission of the vibration of the pressure receiving member 215 to the first mounting portion 216 and the second mounting portion 217 via the seatback frame 210.

Other Embodiments

The present invention is not restricted to the second embodiment.

For example, in the second embodiment, the description has been given as to the example where the elastic member 252 is provided to the mounting portion 251 of the actuator 250 which is mounted on the seatback frame 210, but the elastic member 252 may be provided to the actuator 250 which is mounted on the seat cushion frame 220.

Moreover, a part of the pad U may be notched so that the elastic member 252 mounted on the mounting portion 251 of the actuator 250 can be confirmed from behind the seat frame F.

Vehicle Seat According to Third Embodiment

A vehicle seat according to a third embodiment will now be described. Before giving a description on the vehicle seat according to the third embodiment, a problem concerning the conveyance seat will be described.

In general, the vehicle seat is formed by mounting a cushion pad on a seat frame and covering it with a trim cover. A trim cover end in such a vehicle seat is locked by sewing a U-shaped resin hook to the end of the trim cover and hooking the resin hook on the seat frame as described in Japanese Unexamined Patent Application Publication No. 2016-088411.

(Problem to be Solved by Conveyance Seat according to Third Embodiment)

However, in the above-described vehicle seat, when an excessive load has been applied to the seat cushion and the trim cover has moved or when a seat surface of the seat cushion is configured to be raised (tilt up), there is a problem that the hook on the trim cover end is apt to come off.

In view of the above-described problem, it is an object of the present invention to provide a vehicle seat in which the detachment of a trim cover from a seat frame is suppressed by restricting a hooking member to the seat frame even when an excessive load has been applied to the seat cushion and the trim cover has moved or when a seat which can be tilted up is adopted.

Means for Solving Problem

According to a conveyance seat of the following third embodiment, the problem can be solve by the conveyance seat including a seat cushion, in which the seat cushion includes a cushion frame, a pad member mounted on the cushion frame, and a trim cover which covers the pad member, a hooking member having a protruding portion provided thereto is disposed to the trim cover, the cushion frame includes side frames each having an engagement portion which extends in a seat front-to-back direction provided thereto, and the protruding portion of the hooking member is inserted into and engaged with the engagement portion of the side frame.

In the thus configured conveyance seat according to the third embodiment, when the protruding portion of the hooking member is inserted into and engaged with the engagement portion of the cushion frame which extends in the seat front-to-back direction, a position of the hooking member in the seat front-to-back direction can be restricted. Thus, in a case where an excessive load has been applied to the seat cushion and the trim cover has moved or a case where a seat which can be tilted up is adopted, even when the hooking member has moved in a direction to be detached from the cushion frame, the detachment of the hooking member from the cushion frame can be suppressed.

Additionally, in the conveyance seat, preferably, the hooking member includes an outer arrangement portion which is arranged on the outer side of the side frame in the conveyance seat width direction in a state where the hooking member has been engaged with the side frame and an inner arrangement portion arranged on the inner side of the side frame in the conveyance seat width direction, and the protruding portion protrudes outward from the inner arrangement portion in the conveyance seat width direction.

In the above-described configuration, since the protruding portion protrudes outward from the inner side of the side frame in the seat width direction and engages with the engagement portion, the detachment of the hooking member from the cushion frame can be appropriately suppressed.

Further, in the conveyance seat, preferably, a concave portion recessed inward in the conveyance seat width direction is formed on the side frame, the concave portion includes an engagement surface portion on which the engagement portion is arranged, and a length of the outer arrangement portion in a front-to-back direction of the conveyance seat is formed longer than a length of the engagement surface portion.

In the above-described configuration, the outer arrangement portion of the hooking member abuts on the side frame, the inner arrangement portion abuts on an outer surface portion of the side frame at a position where the inner arrangement portion is separated from the outer arrangement portion in the seat width direction, and hence a position of the hooking member in the seat width direction is restricted.

Further, in the conveyance seat, preferably, the engagement portion is arranged ahead of the center of the seat cushion in the front-to-back direction.

In the above-described configuration, when the engagement portion of the side frame with which the protruding portion of the hooking member is arranged ahead of the center of the seat cushion, the detachment of the hooking member from the cushion frame can be suppressed when an occupant (a seat occupant) gets on or off.

Furthermore, in the conveyance seat, preferably, the engagement portion is arranged on the outer side of the side frame in the conveyance seat width direction.

In the above-described configuration, the workability at the time of hooking the hooking member on the engagement portion can be improved.

Moreover, in the conveyance seat, preferably, the engagement portion is provided inside an outer end surface of the side frame in the conveyance seat width direction.

In the above-described configuration, since the engagement portion is provided inside the outer end surface of the side frame, even if an occupant has come into contact with the outer end surface of the side frame when he/she carries out an operation to get on/off, the detachment of the hooking member from the cushion frame can be suppressed.

Additionally, in the conveyance seat, preferably, the side frame includes a main body portion and a bracket member mounted on the main body portion, and the engagement portion is formed on the bracket member.

In the above-described configuration, since the engagement portion is provided on the member different from the main body portion of the side frame, the design is facilitated.

Further, in the conveyance seat, preferably, the bracket member includes a base portion, and a mounting portion bent from the base portion, the main body portion of the side frame includes a flange portion extending inward in the conveyance seat width direction, and the attachment portion is fixed to the side frame at the flange portion.

In the above-described configuration, since the bracket member having the engagement portion formed thereto is stably mounted on the main body portion of the side frame, the hooking of the hooking member on the side frame is stabilized.

Furthermore, in the conveyance seat, preferably, the bracket member is fixed to the main body portion of the side frame in the conveyance seat width direction.

In the above-described configuration, since the bracket member having the engagement portion formed thereto is mounted on the main body portion of the side frame in the seat width direction, the hooking of the hooking member on the side frame is stabilized.

Moreover, in the conveyance seat, preferably, the bracket member is a part of a tilt mechanism which tilts the seat cushion.

In the above-described configuration, even in the conveyance seat which can tilt (tilt up) the seat cushion, the detachment of the hooking member from the cushion frame is suppressed at the time of a seat cushion tilt operation.

(Effects of Conveyance Seat according to Third Embodiment)

According to the conveyance seat of the third embodiment, when an excessive load has been applied to the seat cushion and the trim cover has moved or when the seat which can be tilted up is adopted, even if the hooking member has moved in a direction to be detached from the cushion frame, the detachment of the hooking member from the cushion frame is suppressed.

Further, according to the conveyance seat of the present invention, since the protruding portion protrudes outward in the seat width direction from the inner side of the side frame and engages with the engagement portion, the hooking member is appropriately inhibited from being detached from the cushion frame.

Additionally, according to the conveyance seat of the following third embodiment, the outer arrangement portion of the hooking member abuts on the side frame, the inner arrangement portion abuts on the engagement surface portion of the side frame at a position where the inner arrangement portion is separated from the outer arrangement portion in the seat width direction, and hence a position of the hooking member is restricted in the seat width direction.

Further, according to the conveyance seat of the following third embodiment, since the engagement portion of the side frame with which the protruding portion of the hooking member engages is arranged ahead of the center of the seat cushion, the detachment of the hooking member from the cushion frame is suppressed when an occupant (a seat occupant) gets on or off.

Furthermore, according to the conveyance seat of the following third embodiment, the workability at the time of hooking the hooking member on the engagement portion is improved.

Moreover, according to the conveyance seat of the following third embodiment, since the engagement portion is provided on the inner side of the outer end surface of the side frame, even if an occupant has come into contact with the outer end surface of the side frame when he/she carries out an operation to get on/off, the detachment of the hooking member from the cushion frame is suppressed.

Additionally, according to the conveyance seat of the following third embodiment, since the engagement portion is provided on the member different from the main body portion of the side frame, the design can be facilitated.

Further, according to the conveyance seat of the following third embodiment, since the bracket member having the engagement portion formed thereto can be stably disposed to the main body portion of the side frame, the hooking of the hooking member to the side frame can be stabilized.

Furthermore, according to the conveyance seat of the following third embodiment, since the bracket member having the engagement portion formed thereto is disposed to the base portion of the side frame in the seat width direction, the hooking of the hooking member to the side frame is stabilized.

Moreover, according to the conveyance seat of the following third embodiment, even in the conveyance seat which can tilt (tilt up) the seat cushion, the hooking member is inhibited from being detached from the cushion frame at the time of a seat cushion tilt operation.

A description will be given below on a seat frame of a vehicle seat S300 according to the third embodiment of the present invention (which will be referred to as the third embodiment hereinafter) with reference to FIG. 18 to FIG. 25B. As a seat frame according to this embodiment, an example of a seat frame which forms a framework of a vehicle seat mounted in a vehicle will be described, but it is not restricted to the seat frame for the vehicle seat.

It is to be noted that the third embodiment described below is just an example which facilitates the understanding of the present invention, and it does not restrict the present invention. That is, shapes, dimensions, arrangements, and others of members described below can be modified or improved without deviating from the purpose of the present invention, and it is needless to say that their equivalents are included in the present invention.

In the following description, a "front-to-back" direction" means a front-to-back direction when viewed from an occupant of a vehicle seat, and it is a direction which coincides with a traveling direction of a vehicle.

A "seat width direction" means a breadth direction of the vehicle seat, and it coincides with a right-and-left direction when viewed from the occupant of the vehicle seat.

Additionally, an "up-and-down direction" means a height direction of the vehicle seat, and it coincides with an up-and-down direction when the vehicle seat is viewed from the front.

A "a seat inner direction" means an inner direction of the vehicle seat (a direction toward the center of the vehicle seat), and a "seat frame inner direction" means an inner direction of a seat frame (a direction toward the center of the seat frame).

(Configuration of Vehicle Seat S300)

Figure 18:
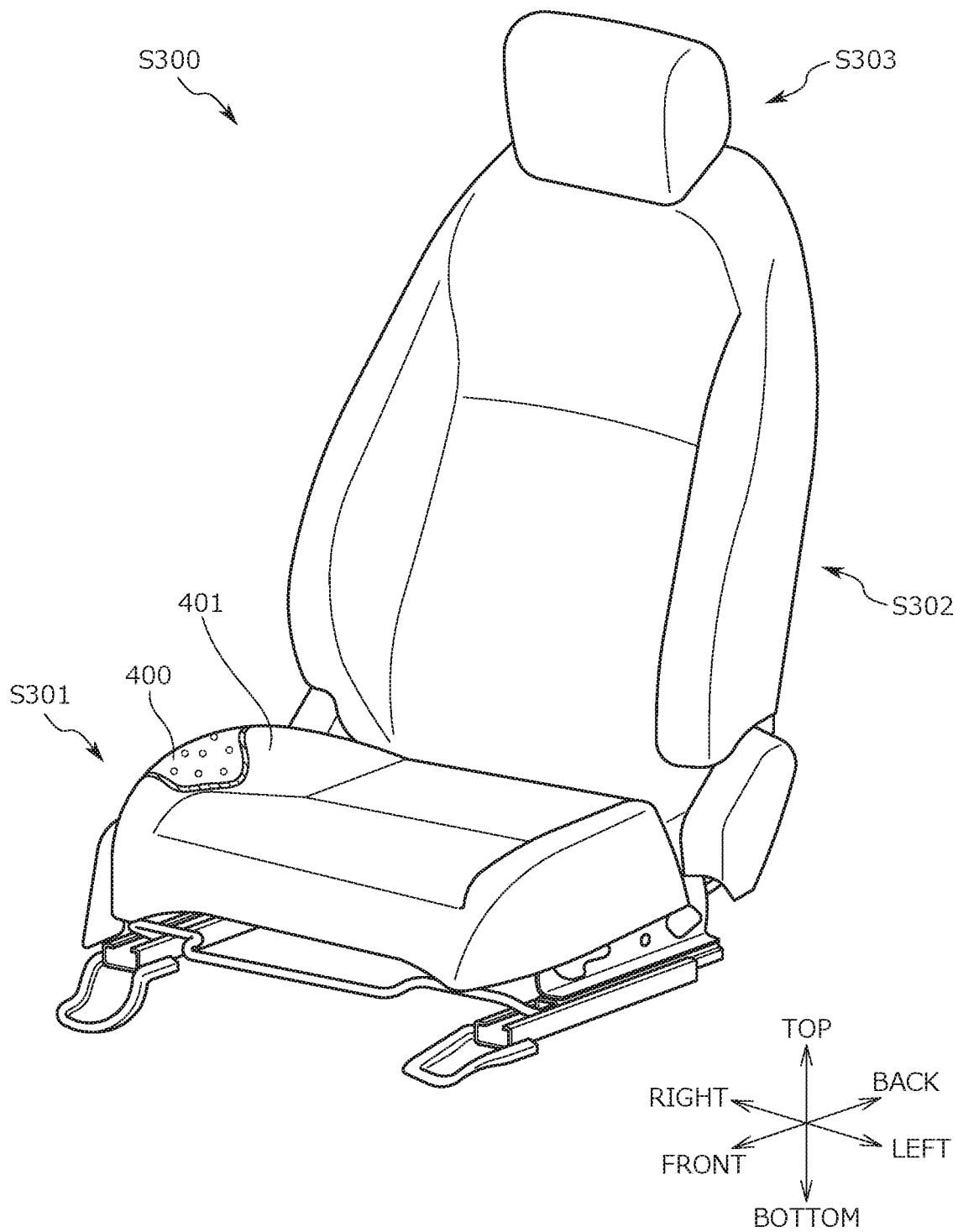
FIG. 18 is an appearance drawing of a vehicle seat according to a third embodiment.

A vehicle seat S300 according to the third embodiment has an appearance shown in FIG. 18. It is to be noted that, in FIG. 1, a part of the vehicle seat S300 (which is specifically a front end corner portion of a seat cushion S301) is shown as a configuration with a trim cover 401 removed therefrom for the convenience of illustration.

The vehicle seat S300 has, as main constituent elements, the seat cushion S301 which becomes a sitting part supporting the buttocks of a seat occupant, a seatback S302 which becomes a backrest part supporting the back of the seat occupant, and a headrest S303 which is arranged above the seatback S302 and supports the head of the seat occupant. Each of the seat cushion S301 and the seatback S302 is constituted by mounting a cushion pad 400 on a later-described seat cushion frame 301 and a non-illustrated seatback frame and covering the cushion pad 400 with a trim cover 401. It is to be noted that, as the seat cushion S301 and the seatback S302, well-known configurations are adopted except for a tilt bracket 320 or a hooking member 330 which will be described later.

The seat cushion S301 is constituted of the seat cushion frame 301, the cushion pad 400 mounted on the seat cushion frame 301, and the trim cover 401 which covers the seat cushion frame 301 and the cushion pad 400.

The cushion pad 400 is made of a cushion material having elasticity, e.g., urethane foam, and the trim cover 401 is made of synthetic leather or cloth, and it is formed by sewing a plurality of surface skin materials.

(Outline of Seat Frame)

Figure 19:
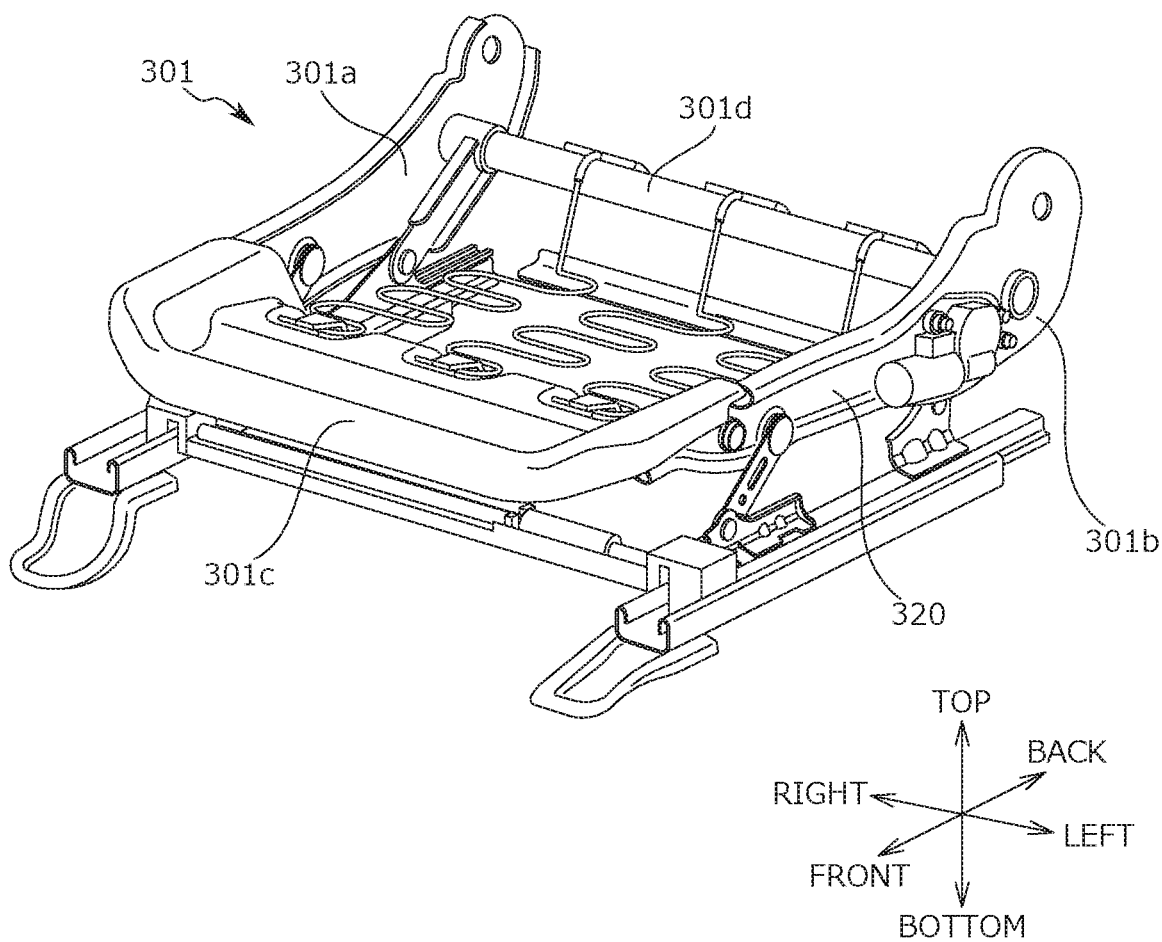
FIG. 19 is a perspective view of a seat cushion frame of the vehicle seat according to the third embodiment.

A description will be first given on an outline of a structure of the seat cushion frame 301 according to the third embodiment with reference to FIG. 19. The seat cushion frame 301 is supported by leg portions, and the leg portions have inner rails mounted thereto and assembled as a sliding type so that a positional adjustment is possible in the front-to-back direction between the inner rails and outer rails installed on a vehicle body floor. Further, a rear end portion of the seat cushion frame 301 is coupled with a non-illustrated seatback frame through a non-illustrated reclining mechanism.

As shown in FIG. 19, the seat cushion frame 301 has an outer shape which is a rectangular frame shape when viewed from above. Further, the seat cushion frame 301 has, as main constituent elements, side frames 301a and 301b constituting end portions in the seat width direction, a pan frame 301c constituting a front end portion of the seat cushion frame 1, and a coupling pipe 301d which couples the right side frame 301a with the left side frame 301b.

The two (the pair of) side frames 301a and 301b are arranged to be separated from each other in the right-and-left direction to define a width of the seat cushion frame 301, and they are arranged to extend in the front-to-back direction. Further, the coupling pipe 301d is disposed on the rear side of the side frames 301a and 301b, and the right and left side frames 301a and 301b are coupled with each other on the rear side by the coupling pipe 301d.

Furthermore, the pan frame 301c is secured and bonded to the front side of the pair of side frames 301a and 301b, and the right and left side frames 301a and 301b are coupled with each other on the front side by the pan frame 301c. More specifically, end portions of the pan frame 301c in the right-and-left direction are fixed to flanges provided to the side frames 301a and 301b by fixing means, e.g., welding, respectively.

The pan frame 301c is mainly configured to support the thigh of a seat occupant (an occupant), and it is a frame made of a metal plate material having an upper surface formed into a substantially flat and nearly rectangular shape. The pan frame 301c includes a front bent portion provided by bending the front end portion downward and a rear bent portion provided by bending the rear end portion downward. Moreover, a support surface whose upper surface is substantially flat is provided between the front bent portion and the rear bent portion. It is to be noted that end portions of the support surface in the right-and-left direction are fixed to the flanges of the side frames 301a and 301b, respectively (FIG. 19).

(Configuration of Side Frame)

Figure 20A:
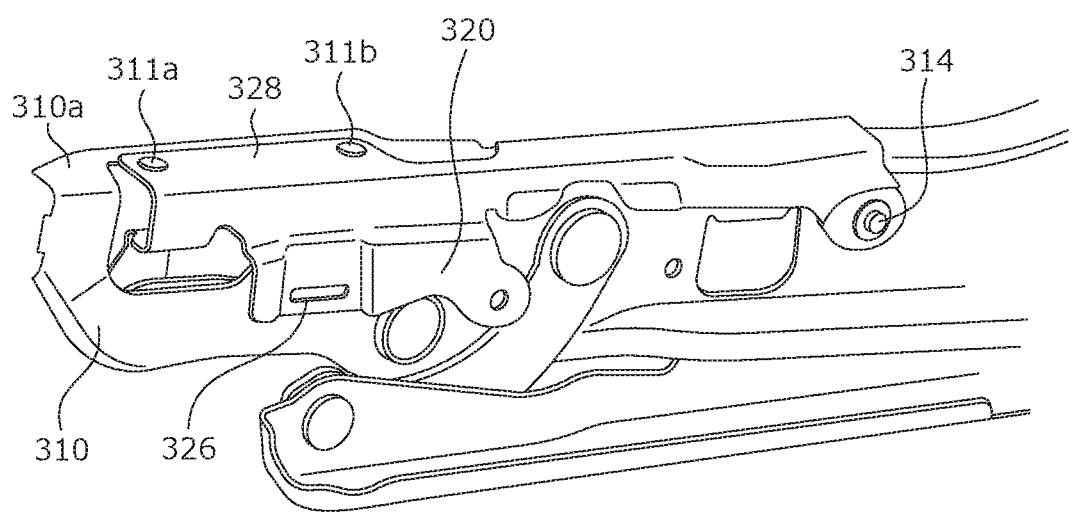
FIG. 20A is a perspective view showing a part of a side frame of the vehicle seat according to the third embodiment.
Figure 20A:
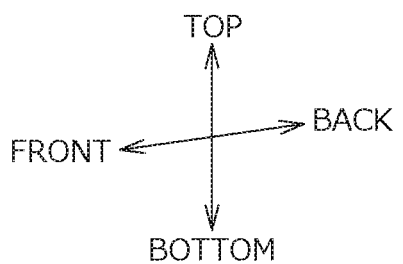
Figure 20B:
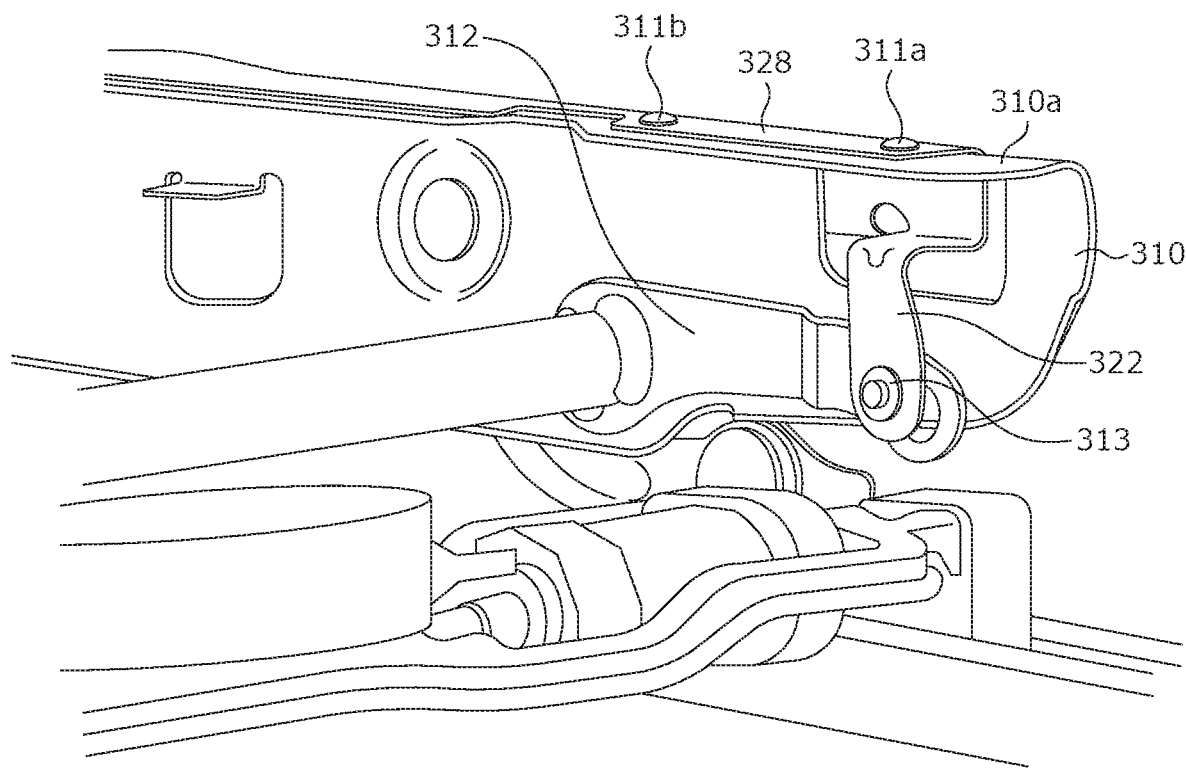
FIG. 20B is a perspective view showing a part of the side frame of the vehicle seat according to the third embodiment.
Figure 20B:
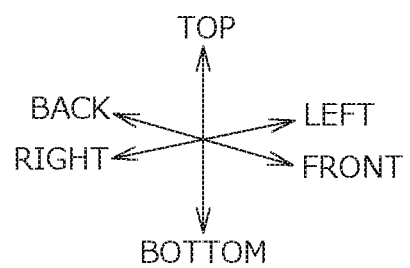
Figure 21A:
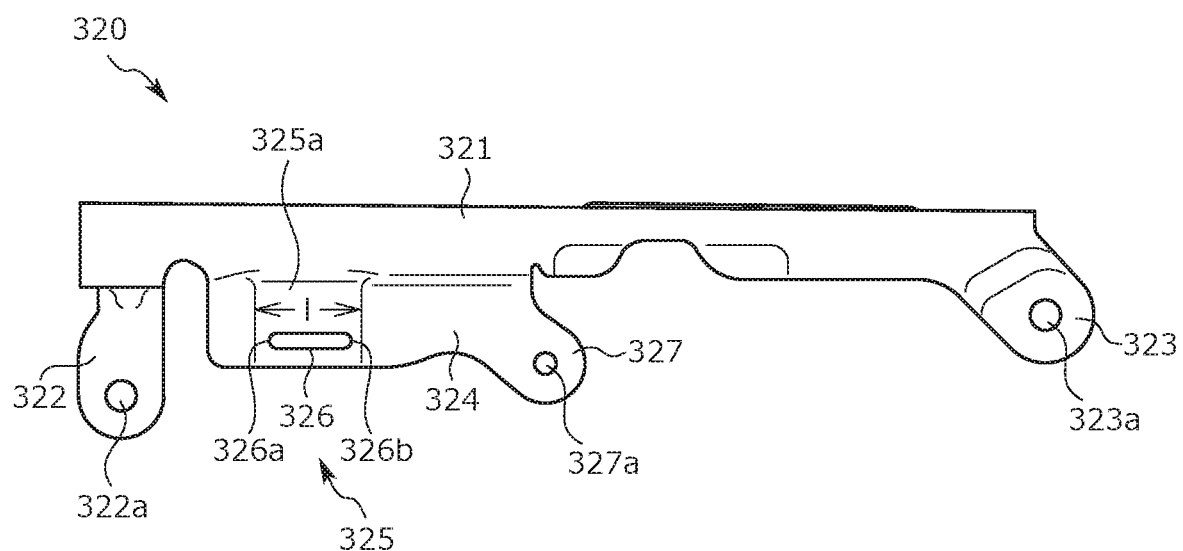
FIG. 21A is a front view of a tilt bracket constituting a seat cushion frame of the vehicle seat according to the third embodiment.
Figure 21B:
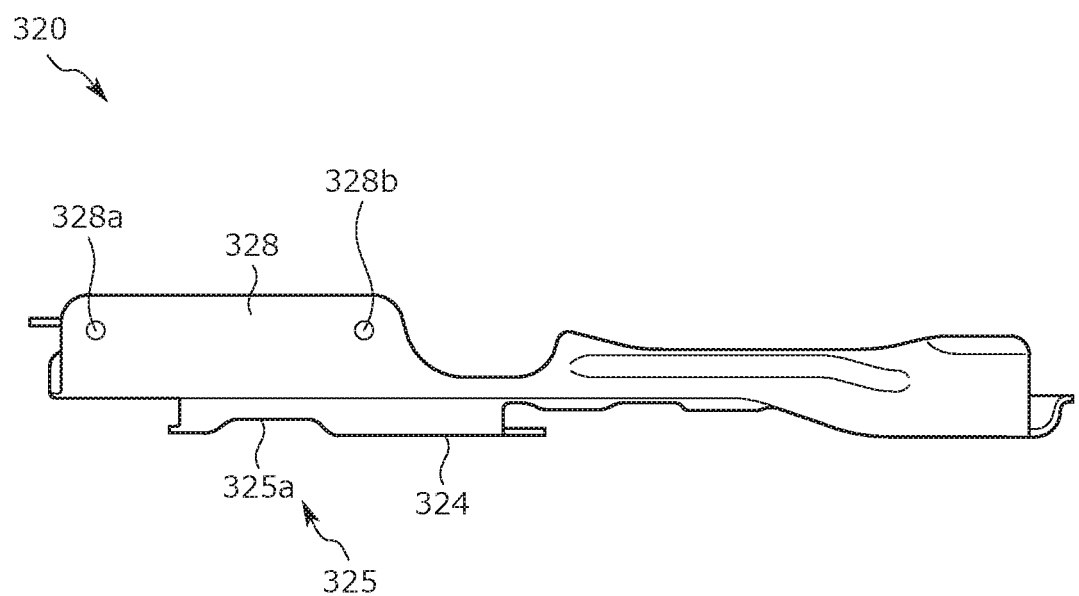
FIG. 21B is a top view of the tilt bracket constituting a seat cushion frame of the vehicle seat according to the third embodiment.

A description will now be given below on the side frames 301a and 301b and a tilt bracket 320 constituting the seat cushion frame 301 of the vehicle seat S300 according to the third embodiment with reference to FIGS. 20A to 21B. Although one side frame 301b will be described below, the other side frame 301a has the same configuration. FIG. 20A is a perspective view showing the tilt bracket 320 mounted on the side frame 301b from the outer side in the seat width direction, and FIG. 20B is a perspective view showing the tilt bracket 320 mounted on the side frame 301b from the inner side in the seat width direction. FIG. 21A is a front view of the tilt bracket 320, and FIG. 21B is a top view of the tilt bracket 320.

As shown in FIGS. 20A and 20B, the side frame 301b has a side frame main body 310 extending in the seat front-to-back direction and the tilt bracket 320 mounted on the side frame main body 310 as main constituent elements, and a tilt mechanism (a tilt-up mechanism) such as a link member 312 is mounted.

The side frame main body 310 includes a flange portion 310a extending in the seat frame inner direction. An upper mounting portion 328 of the later-described tilt bracket 320 is mounted on the flange portion 310a by fastening members 311a and 311b.

Additionally, a front mounting portion 322 of the tilt bracket 320 is mounted on the side frame main body 310 by a fastening member 313, and a rear mounting portion 323 of the tilt bracket 320 is mounted on the same by a fastening member 314.

As shown in FIGS. 20A and 21A, the tilt bracket 320 includes a base portion 321, the front mounting portion 322 provided at a front end portion of the base portion 321, the rear mounting portion 323 provided at a rear end portion of the base portion 321, and an extending portion 324 provided between the front mounting portion 322 and the rear mounting portion 323. In the front mounting portion 322 and the rear mounting portion 323, a mounting hole 322a and a mounting hole 323a into which fastening members are inserted are provided, respectively.

An engagement concave portion 325 is provided to the extending portion 324, and an engagement hole 326 extending in a longitudinal direction (the seat front-to-back direction) of the base portion 321 is formed in an engagement surface portion 325a which is a bottom portion of the engagement concave portion 325. On the rear side of the extending portion 324, a buckle mounting portion 327 configured to mount a non-illustrated seatback buckle is provided. A buckle mounting hole 327a into which a fastening member is inserted is provided in the buckle mounting portion 327.

The upper mounting portion 328 bent from the base portion 321 is formed to the tilt bracket 320, a mounting hole 328a is formed on the front side of the upper mounting portion 328, and a mounting hole 328b is formed on the rear side of the upper mounting portion 328.

As shown in FIG. 20B, the link member 312 is mounted between the side frame main body 310 and the front mounting portion 322 of the tilt bracket 320 through the fastening member 313. In this embodiment, the link member 312 or the tilt bracket 320 is a part of the tilt mechanism (the tilt-up mechanism) which raises a seat surface of the seat cushion S301.

In the third embodiment, the engagement hole 326 of the tilt bracket 320 corresponds to an engagement portion into which a hook portion 333 (a protruding portion) of the later-described hooking member 330 is inserted.

(Configurations of Trim Cover and Hooking Member)

Figure 22A:
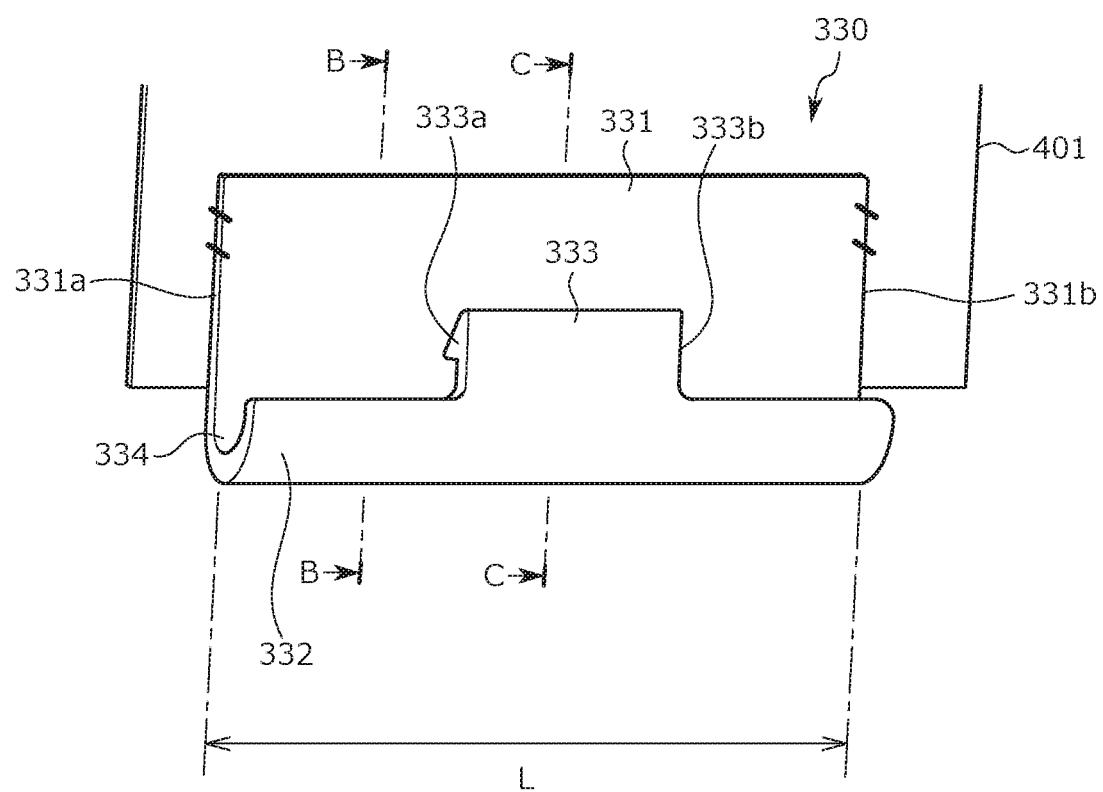
FIG. 22A is a perspective view showing a hooking member according to the third embodiment.
Figure 22B:
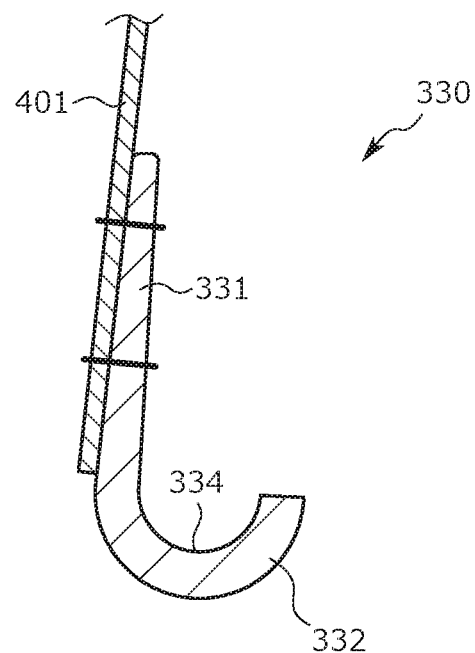
FIG. 22B is a B-B cross-sectional view of FIG. 22A.
Figure 22C:
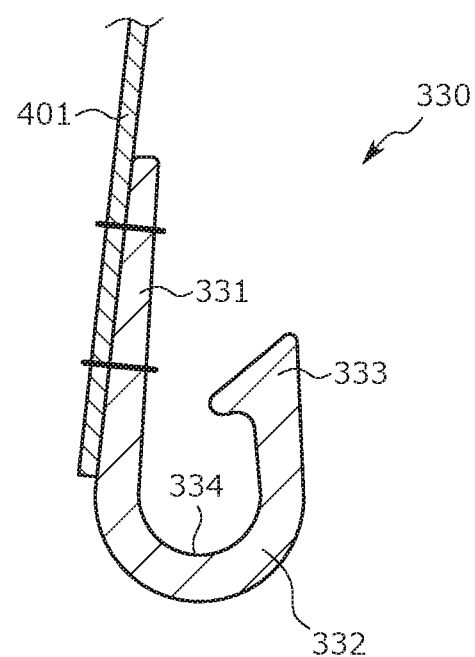
FIG. 22C is a C-C cross-sectional view of FIG. 22A.

FIGS. 22A to 22C show the hooking member 330 according to the third embodiment. FIG. 22A is a perspective view of the hooking member 330 sewed to the trim cover 401, FIG. 22B is a B-B cross-sectional view of FIG. 22A, and FIG. 22C is a C-C cross-sectional view of FIG. 22A.

As shown in FIG. 22A, the hooking member 330 which is made of a resin and has a J-shaped cross section has been sewed to an end portion of the trim cover 401. The hooking member 330 includes a base portion 331, a curved portion 332 formed by curving the base portion 331, and the hook portion 333 extending from the curved portion 332.

The hooking member 330 has the hook portion 333 at an end portion on the opposite side of the portion sewed to the trim cover 401. Further, on the J-shaped inner side of the hooking member 330, an accommodating portion 334 to accommodate the extending portion 324 of the tilt bracket 320 is formed.

As shown in FIG. 22A, the hook portion 333 is formed to extend from a part of the curved portion 332. Specifically, a distance L between a first side end surface 331a and a second side end surface 331b of the base portion 331 in a longitudinal direction (a length L of the base portion 331 in the longitudinal direction) is set longer than a distance between a first side end surface 333a and a second side end surface 333b of the hook portion 333 in the longitudinal direction (a length of the hook portion 333 in the longitudinal direction).

In other words, the hook portion 333 is formed in such a manner that the first side end surface 333a of the hook portion 333 is present on the second side end surface 331b side rather than the first side end surface 331a of the base portion 331 and the second side end surface 333b of the hook portion 333 is present on the first side end surface 331a side rather than the second side end surface 331b of the base portion 331.

As shown in FIG. 22C, the hook portion 333 is formed in such a manner that its protruding direction becomes a direction toward the J-shaped inner side (in other words, a direction toward the base portion 331).

When the extending portion 324 of the tilt bracket 320 is accommodated in the accommodating portion 334 of the hooking member 330 and the hook portion 333 (the protruding portion) of the hooking member 330 is engaged with the engagement hole 326 (the engagement portion) of the tilt bracket 320, the trim cover 401 is mounted on the seat cushion frame 301.

(Function of Hooked Portion)

Figure 23A:
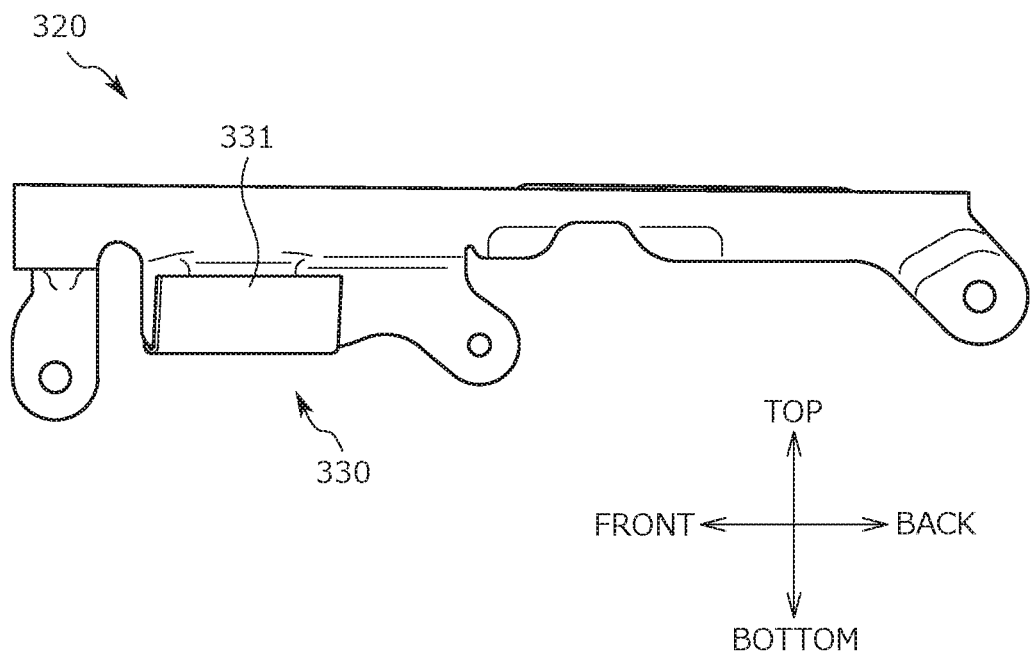
FIG. 23A is a front elevation showing a state where the hooking member is engaged with an engagement hole provided in a side frame of the vehicle seat according to the third embodiment.
Figure 23B:
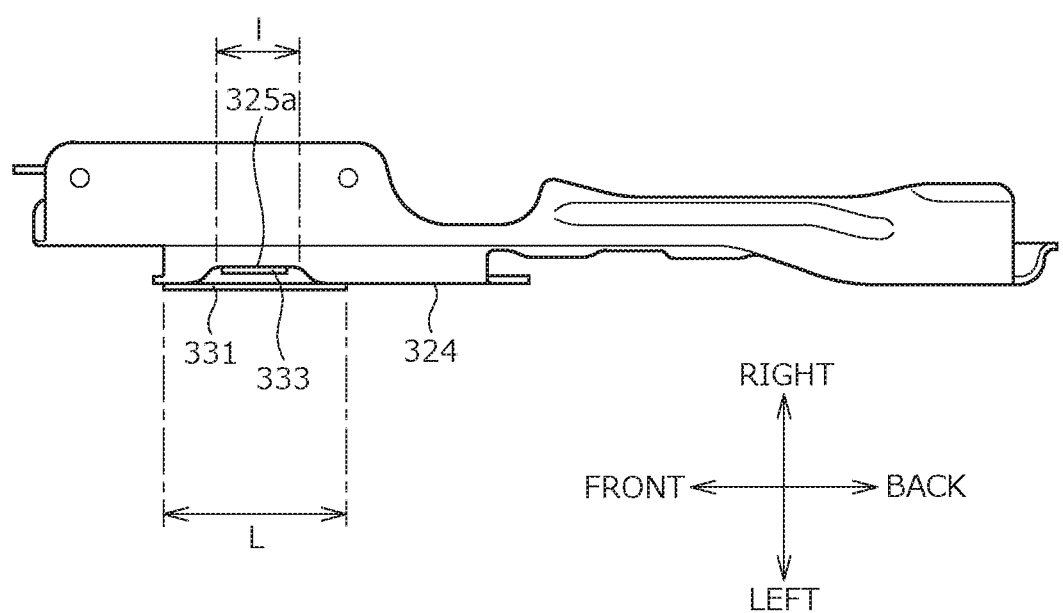
FIG. 23B is a top view showing a state where the hooking member is engaged with the engagement hole provided in the side frame of the vehicle seat according to the third embodiment.
Figure 24:
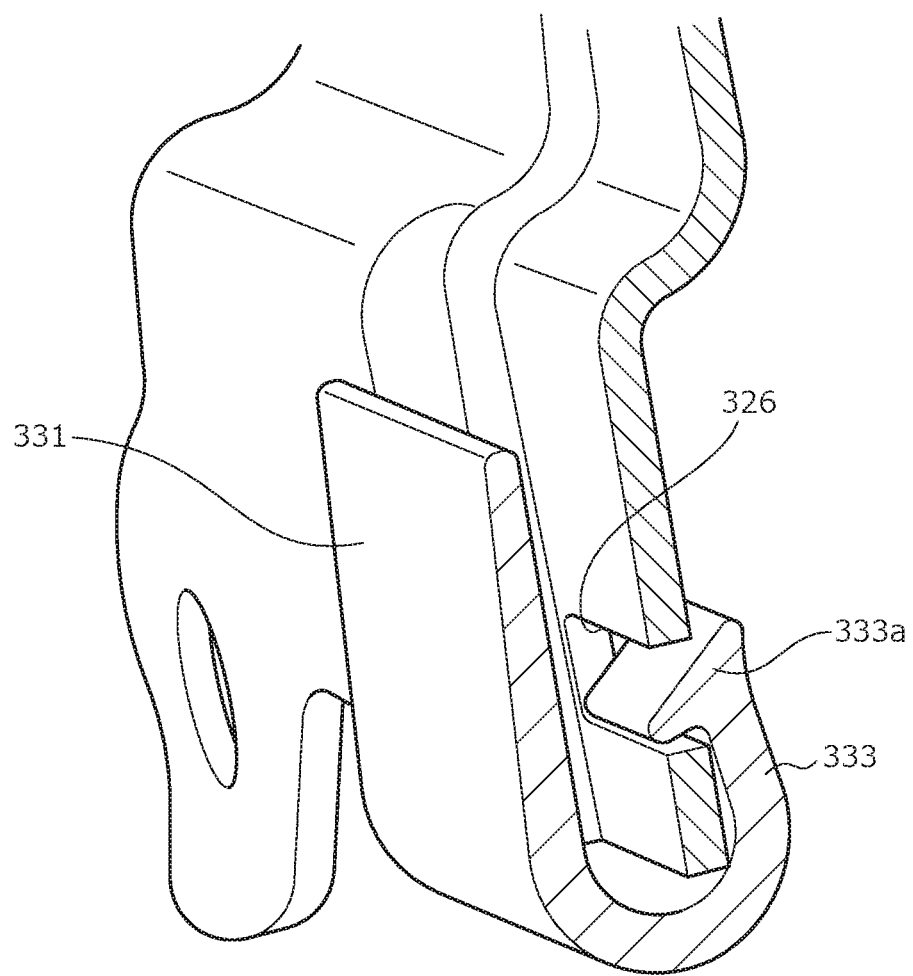
FIG. 24 is a perspective explanatory drawing showing a state where the hooking member is engaged with the engagement hole provided in the side frame of the vehicle seat according to the third embodiment.

FIGS. 23A and 23B and FIG. 24 show a state where the hook portion 333 of the hooking member 330 provided at the end portion of the trim cover 401 is engaged with the engagement hole 326 of the tilt bracket 320. It is to be noted that, in FIGS. 23A and 23B and FIG. 24, the trim cover 401 is omitted for the purpose of illustration.

In a state where the cushion pad 400 has been placed on the seat cushion frame 301, the trim cover 401 covers the outer side of the side frame 301b in the seat width direction, and the hooking member 330 is engaged with the tilt bracket 320 from the lower end side of each of the side frames 301a and 301b.

Further, the extending portion 324 of the tilt bracket 320 is positioned in the accommodating portions 334 of the hooking member 330, and the hook portion 333 of the hooking member 330 is locked in the engagement hole 326 of the tilt bracket 320. In this manner, the hooking member 330 is disposed to the side frame 301b.

FIG. 24 is a perspective explanatory drawing showing a cross section of the periphery of the hook portion 333 and the engagement hole 326, and it is an explanatory drawing showing a state where the hook portion 333 is engaged with the engagement hole 326. In a state where the hooking member 330 is engaged with the engagement hole 326, the hook portion 333 of the hooking member 330, the extending portion 324 of the tilt bracket 320, and the base portion 331 of the hooking member 330 are arranged in the order from the outer side in the seat width direction.

In a state where the hooking member 330 is engaged with the tilt bracket 320 of the side frame 301b, the base portion 331 (the outer arrangement portion) is arranged on the outer side of the tilt bracket 320 in the seat width direction, the hook portion 333 (the inner arrangement portion) is arranged on the inner side of the tilt bracket 320 in the seat width direction, and the hook portion 333 (the protruding portion) protrudes on the side toward the base portion 331 (the outer side) in the seat width direction.

Thus, the base portion 331 (the outer arrangement portion) of the hooking member 330 abuts on the tilt bracket 320, the hook portion 333 (the inner arrangement portion) abuts on the outer surface portion of the tilt bracket 320 at a position separated from the base portion 331 (the outer arrangement portion) in the seat width direction, and hence a position of the hooking member 330 in the seat width direction is restricted.

Figure 25A:
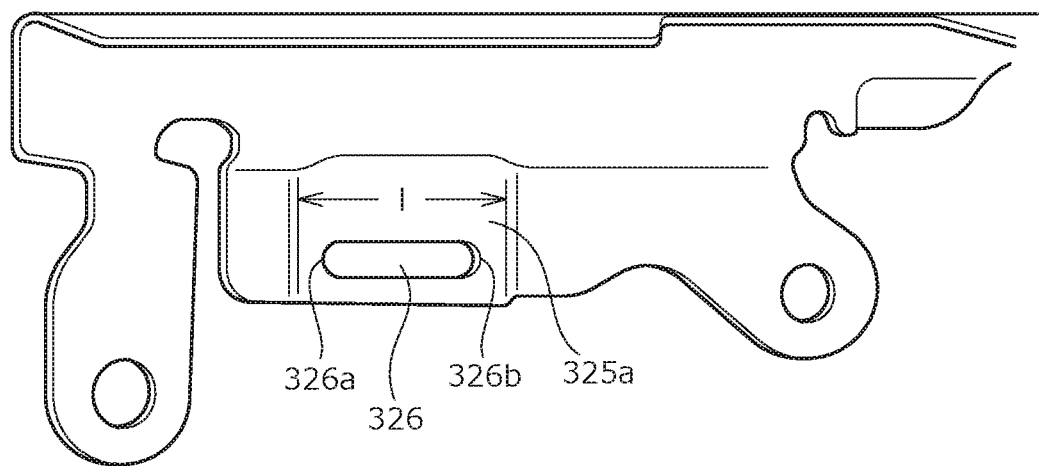
FIG. 25A is an explanatory drawing for illustrating an action brought by the engagement of the engagement hole provided in the side frame of the vehicle seat and the hooking member according to the third embodiment.
Figure 25B:
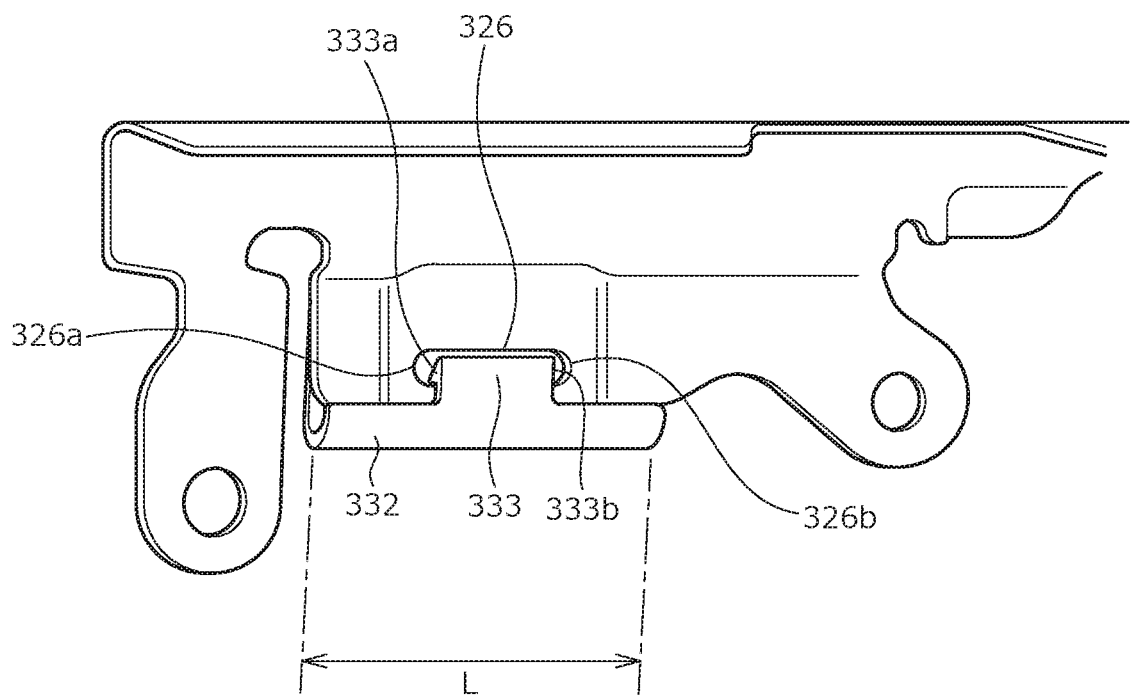
FIG. 25B is an explanatory drawing for illustrating the action brought by the engagement of the engagement hole provided in the side frame of the vehicle seat and the hooking member according to the third embodiment.

Further, as shown in FIGS. 25A and 25B, in a state where the hooking member 330 is engaged with the tilt bracket 320, a position of the first side end portion 333a of the hook portion 333 in the seat front-to-back direction is restricted by the first end portion 326a of the engagement hole 326, and a position of the second side end surface 333b of the hook portion 333 in the seat front-to-back direction is restricted by the second end portion 326b of the engagement hole 326.

That is, since engaging the hook portion 333 of the hooking member 330 with the engagement hole 326 causes the position of the hooking member 330 in the seat front-to-back direction to be restricted to an extending range of the engagement hole 326, when an excessive load has been applied to the seat cushion and the trim cover has moved or when a seat which can be tilted up is adopted, the hooking member is inhibited from being detached from the seat cushion frame 301 even if the hooking member 330 has moved in a direction to be detached from the seat cushion frame 301.

Furthermore, assuming that a length of the engagement surface portion 325a of the engagement concave portion 325, which is recessed inward in the seat width direction, in the seat front-to-back direction is I (FIG. 25A), a length L of the base portion 331 (the outer arrangement portion) in the seat front-to-back direction (FIG. 25B) is formed longer than the length I of the engagement surface portion 325a (L> I).

Thus, the base portion 331 (the outer arrangement portion) of the hooking member 330 abuts on the tilt bracket 320 (the side frame), the hook portion 333 (the inner arrangement portion) abuts on the outer surface portion of the tilt bracket 320 (the outer surface of the extending portion 324) at a position separated from the base portion 331 in the seat width direction, and hence a position of the hooking member 330 in the seat width direction is restricted.

In the vehicle seat S300 according to the third embodiment, since the engagement hole 326 (the engagement portion) is arranged on the outer side of each of the side frames 301a and 30b in the seat width direction, the workability at the time of hooking the hooking member 330 to the engagement hole 326 is improved.

In the vehicle seat S300 according to the third embodiment, since the engagement hole 326 (the engagement portion) is arranged on the inner side of the outer end surface of each of the side frames 301a and 30b in the seat width direction, even if an occupant has touched the outer end portion of the side frames 301a or 301b at the time of performing an operation to get on/off, the hooking member 330 is inhibited from being detached from the seat cushion frame 301.

In the vehicle seat S300 according to the third embodiment, each of the side frames 301a and 301b includes the tilt bracket 320 mounted on the side frame main body 310, the engagement hole 326 (the engagement portion) is formed in the tilt bracket 320, and hence an effect to facilitate designing each member can be exerted.

In the vehicle seat S300 according to the third embodiment, the tilt bracket 320 includes the upper mounting portion 328 which extends toward the inner side in the seat width direction, and the upper mounting portion 328 is fixed on the flange portion 310a of the side frame main body 310. Thus, the tilt bracket 320 is stably mounted on the side frame main body 310, and hence an effect to stabilize the hooking of the hooking member 330 to each of the side frames 301a and 301b can be exerted.

In the vehicle seat S300 according to the third embodiment, since the tilt bracket 320 having the engagement hole 326 (the engagement portion) formed therein is fixed to the side frame main body 310 of each of the side frames 301a and 301b in the seat width direction, an effect to stabilize the hooking of the hooking member 330 to each of the side frames 301a and 301b can be exerted.

In the vehicle seat S300 according to the third embodiment, the seat cushion S301 can be tilted (tilted up), and the tilt bracket 320 is a part of the tilt mechanism which tilts the seat cushion S301, but a position of the hooking member 330 is appropriately restricted, and hence the hooking member 330 is inhibited from being detached from each of the side frames 301a and 301b in a tilt operation of the seat cushion S301.

(Modification)

The third invention is not restricted to the foregoing embodiment. In FIG. 21A, as an example of the engagement portion provided in the tilt bracket 320 (the side frame), the example of the engagement hole 326 has been illustrated, but the engagement portion is not limited to a hole configuration. For example, the engagement hole may take a configuration of, e.g., a groove, a notch, or a concave portion having a restricting surface which restricts a position of the hooking member 330 in a longitudinal direction of the side frame (the seat front-to-back direction).

In FIG. 22A, the example where the one hook portion 333 (the protruding portion) is provided is shown, but the number of the protruding portion is not restricted thereto, and the number of the protruding portions can be two or more as long as the hooking member 330 can be stably locked.

In the above-described third embodiment, as shown in FIG. 20A, the example where the engagement hole 326 (the engagement portion) is provided in the tilt bracket 320 which is a part of each of the side frames 301*a* and 301*b* has been illustrated, but the position at which the engagement portion is arranged is not restricted thereto, and the engagement portion can be provided in a member, e.g., the side frame main body 310 constituting each of the side frames 301*a* and 301*b*.

The description has been given on the vehicle seat mounted in a vehicle as an example of the conveyance seat according to the third embodiment. The conveyance seat according to this embodiment is not restricted to the vehicle seat, and its use application is not restricted in particular as long as it is a seat frame of a seat constituted by covering the cushion pad mounted on the seat frame with the cover member, especially a seat adopting a structure in which the cover member is hooked on the seat frame. For example, the conveyance seat according to the present invention can be also used as a seat frame of a conveyance seat used in a conveyance other than vehicles.

REFERENCE SIGNS LIST

S vehicle seat (conveyance seat)
S1 seat cushion
S2 seatback
S3 headrest
1*a* surface skin material
1*b* cushion material
10 cushion frame
11 side frame
11A through hole
12 pan frame
24 coupling pipe
25 pressure receiving member
26 locking member
28 end portion sleeve
30 slide rail mechanism
31 upper rail
32 lower rail
33 fixing bracket
34 front link
40 drive link (link member)
41 sector gear
42 opening portion
43 through hole
44 pivot shaft
50 link-rotation restricting member
51 large-diameter portion
52 small-diameter portion
53 welded portion
55 fixing bracket
60 operation member
61 operating section
62 rotation application section
63A first protruding portion
63B second protruding portion
64 shock absorbing section
64A first notch portion
64B second notch portion
65 rotation shaft
66 outer peripheral portion
68 grip portion
70 gear part
71 pinion gear
H height mechanism
F seat frame
S200 vehicle seat (conveyance seat)
S201 seatback
S202 seat cushion
S203 headrest
U pad
R surface skin material
210 seatback frame
211 upper frame
212 side frame
212A concave portion
212B step portion
212C through hole
212D airbag mounting hole
212E airbag mounting hole
212F bead
213 lower frame
215 pressure receiving member
216 first mounting portion
217 second mounting portion
220 seat cushion frame
221 cushion side frame
222 pan frame
223 coupling bracket
224 coupling pipe
225 rotation shaft
230 slide mechanism
231 lower rail
232 upper rail
235 reclining mechanism
240 height mechanism
250 actuator
251 mounting portion
252 elastic member
252A abutting portion
252B through hole
252C covering portion
253 bolt
254 nut (fastening member)
260 airbag module
261 airbag
262 inflator
263 stud bolt
264 retainer
265 nut
270 stay cloth
271 stay cloth mounting clip
280 accommodation space
S300 vehicle seat
S301 seat cushion
S302 seatback
S303 headrest
400 cushion pad (pad member)
401 trim cover
301 seat cushion frame (cushion frame)
301*a* side frame
301*b* side frame
301*c* pan frame
301*d* coupling pipe
310 side frame main body (main body portion)
310*a* flange portion
311*a* fastening member
311*b* fastening member
312 link member
313 fastening member
314 fastening member
320 tilt bracket (bracket member)
321 base portion
322 front mounting portion
322*a* mounting hole 323 rear mounting portion
323a mounting hole
324 extending portion
325 engagement concave portion
325a engagement surface portion
326 engagement hole (engagement portion)
326a first end portion
326b second end portion
327 buckle mounting portion
327a buckle mounting hole
328 upper mounting portion
328a mounting hole
328b mounting hole
330 hooking member
331 base portion (outer arrangement portion)
331a first side end surface
331b second side end surface
332 curved portion
333 hook portion (protruding portion, inner arrangement portion)
333a first side end portion
333b second side end surface
334 accommodating portion

The invention claimed is:

1. A conveyance seat in which a height of a cushion frame is adjustable, comprising:
   a link member which is rotatably mounted on the cushion frame and moves the cushion frame in a height direction in correspondence with a rotation;
   a gear part which engages with the link member and rotates the link member;
   a link-rotation restricting member which restricts a rotation range of the link member;
   an operating section which accepts an operation to adjust the height of the cushion frame; and
   a rotation application section which rotates the link member via the gear part in correspondence with an operation of the operating section,
   wherein the movement of the operating section is restricted when the link-rotation restricting member abuts the rotation application section.

2. The conveyance seat according to claim 1, wherein the rotation application section comprises a first protruding portion and a second protruding portion which protrude from an outer peripheral portion,
   the link-rotation restricting member is arranged between the first protruding portion and the second protruding portion, and
   the movement of the operating section is restricted when the first protruding portion and the second protruding portion abut the link-rotation restricting member.

3. The conveyance seat according to claim 2, wherein each of the first protruding portion and the second protruding portion is a flange bent from the outer peripheral portion of the rotation application section toward the inside in a seat width direction.

4. The conveyance seat according to claim 1, wherein the cushion frame comprises side frames arranged on side portions,
   the link-rotation restricting member protrudes from each side frame toward the outer side in the seat width direction via a through hole provided in the side frame,
   and the operating section and the rotation application section are mounted on one of the right and left side frames which has the link-rotation restricting member mounted thereto.

5. The conveyance seat according to claim 2, wherein the rotation application section includes a shock absorbing portion configured to absorb a shock when at least one of the first protruding portion and the second protruding portion abuts the link-rotation restricting member.

6. The conveyance seat according to claim 5, wherein the shock absorbing portion comprises:
   a first notch portion which is formed in the first protruding portion on the side opposite to the side facing the second protruding portion; and
   a second notch portion which is formed in the second protruding portion on the side opposite to the side facing the first protruding portion.

7. The conveyance seat according to claim 4, comprising a cushion material arranged on the inner side of the cushion frame,
   wherein the cushion material vertically overlaps a part of the link-rotation restricting member inside the side frame in the seat width direction, and
   the cushion material does not vertically overlap a part of the link-rotation restricting member outside the side frame in the seat width direction.

* * * * *